(12) United States Patent
Padmanabhan et al.

(10) Patent No.: US 8,341,677 B2
(45) Date of Patent: Dec. 25, 2012

(54) INTERACTIVE PRODUCT / SERVICE LISTING

(75) Inventors: Sundar Rajan Padmanabhan, Irving, TX (US); Vijay Jayapalan, Coppell, TX (US); Manvinder S. Chopra, Carrollton, TX (US); Xiaodong Zhang, Flower Mound, TX (US); Mohammad Azam Khan, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 267 days.

(21) Appl. No.: 12/795,901

(22) Filed: Jun. 8, 2010

(65) Prior Publication Data

US 2011/0302614 A1    Dec. 8, 2011

(51) Int. Cl.
*H04N 7/16* (2011.01)
*H04N 5/445* (2011.01)

(52) U.S. Cl. .............................. 725/60; 725/23; 725/61
(58) Field of Classification Search .................. 725/23, 725/60–61
See application file for complete search history.

(56) References Cited

U.S. PATENT DOCUMENTS

| 7,212,730 B2 * | 5/2007 | Boston et al. ................. 386/291 |
| 7,213,254 B2 * | 5/2007 | Koplar et al. ..................... 725/23 |
| 7,444,659 B2 * | 10/2008 | Lemmons ....................... 725/34 |
| 2005/0283799 A1 * | 12/2005 | Domegan et al. ............... 725/38 |

\* cited by examiner

*Primary Examiner* — Hunter B Lonsberry

(57) ABSTRACT

A computing device receives selection of television content from a device associated with a user, and collects metadata associated with the selected television content. The computing device also collects information associated with commercials associated with the television content, and determines an interactive product/service listing based on the collected metadata and commercial information. The device further provides the interactive product/service listing to the device for display to the user.

25 Claims, 25 Drawing Sheets

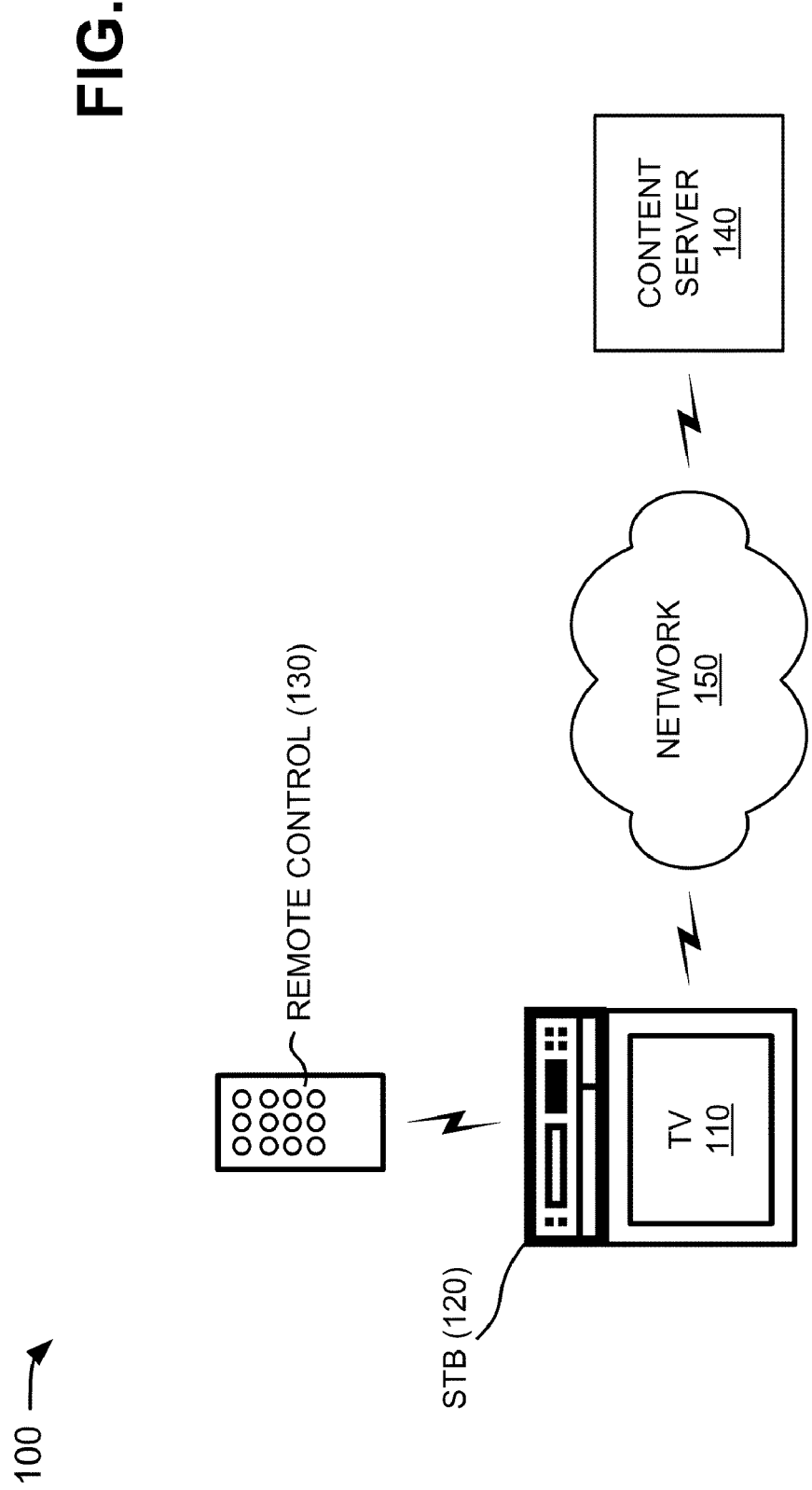

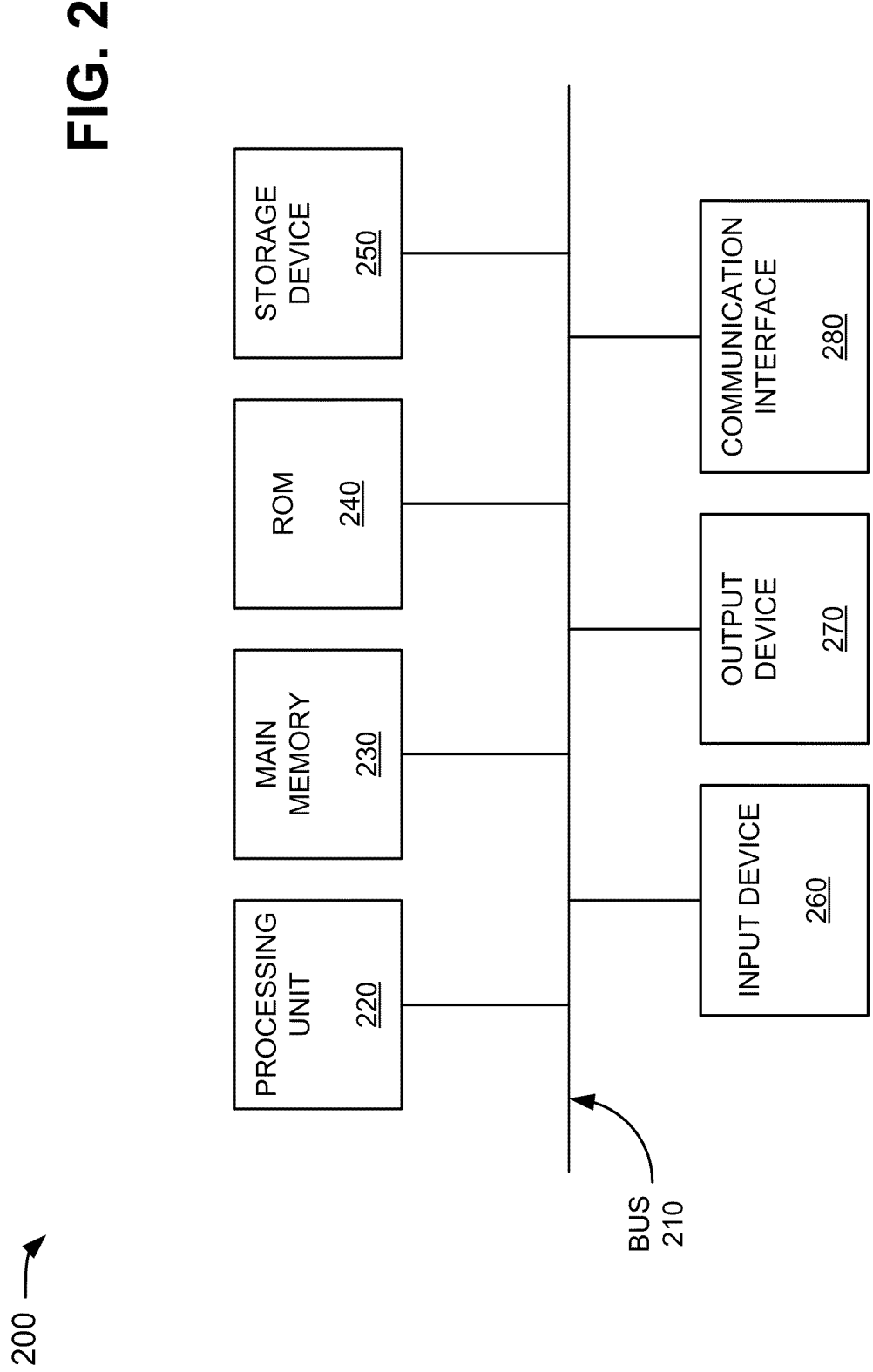

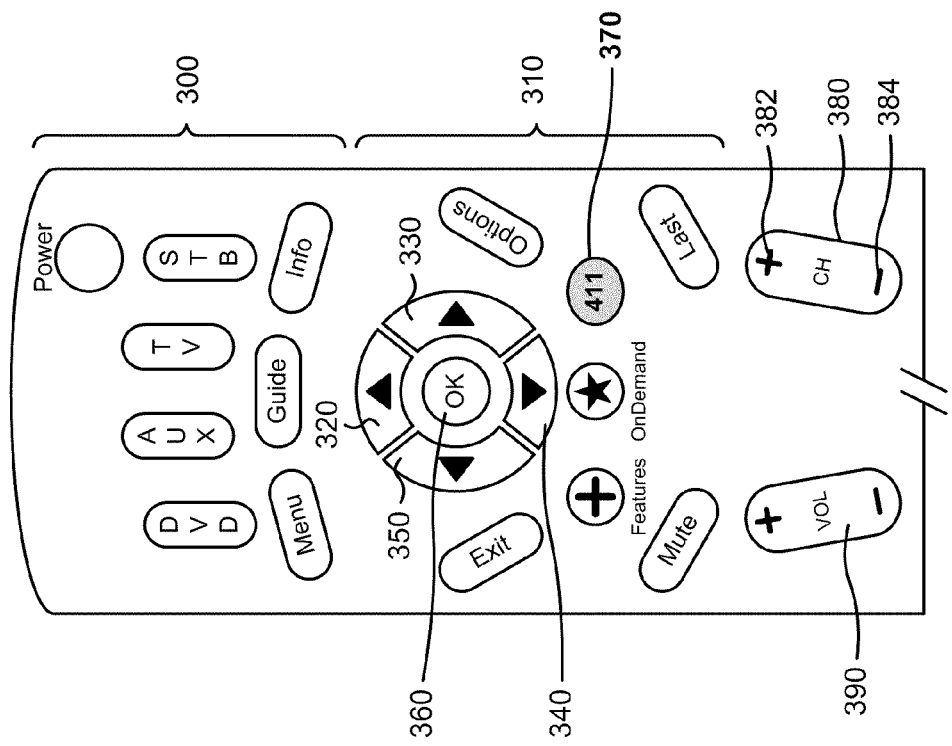

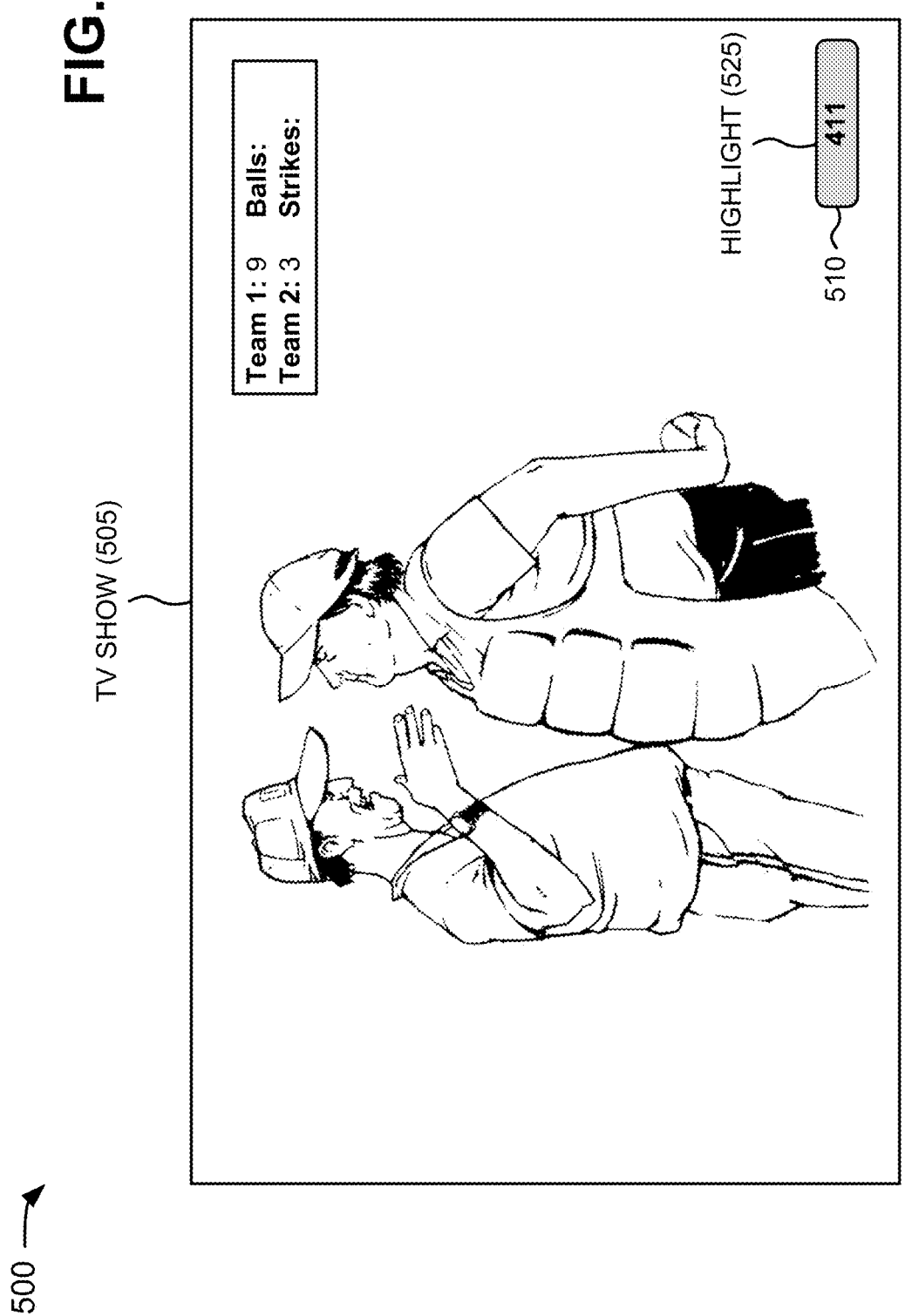

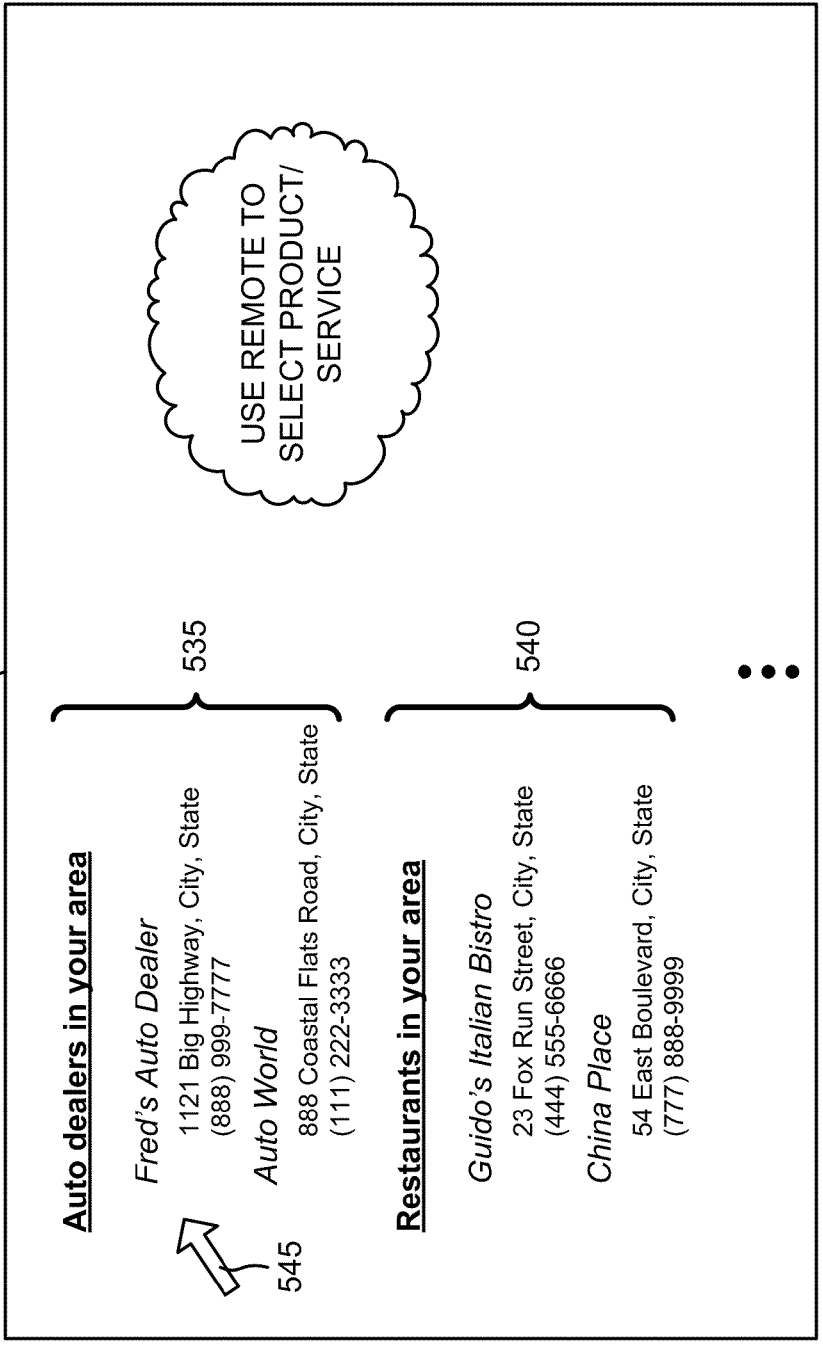

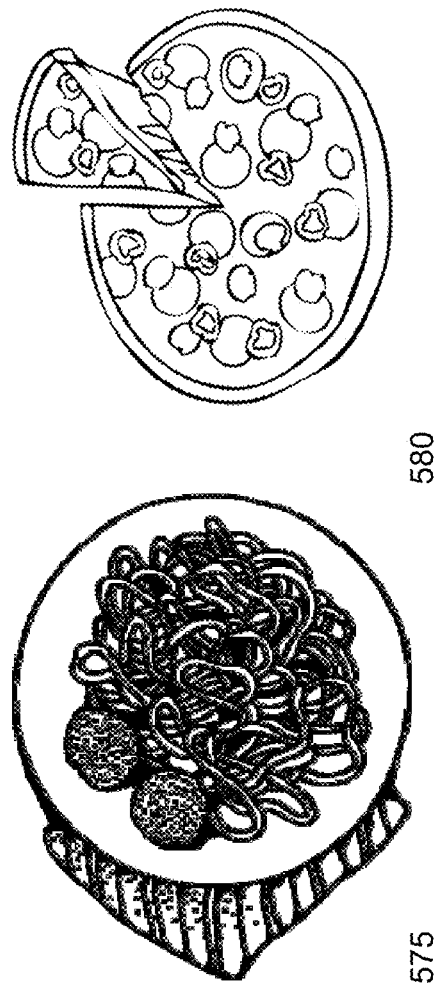

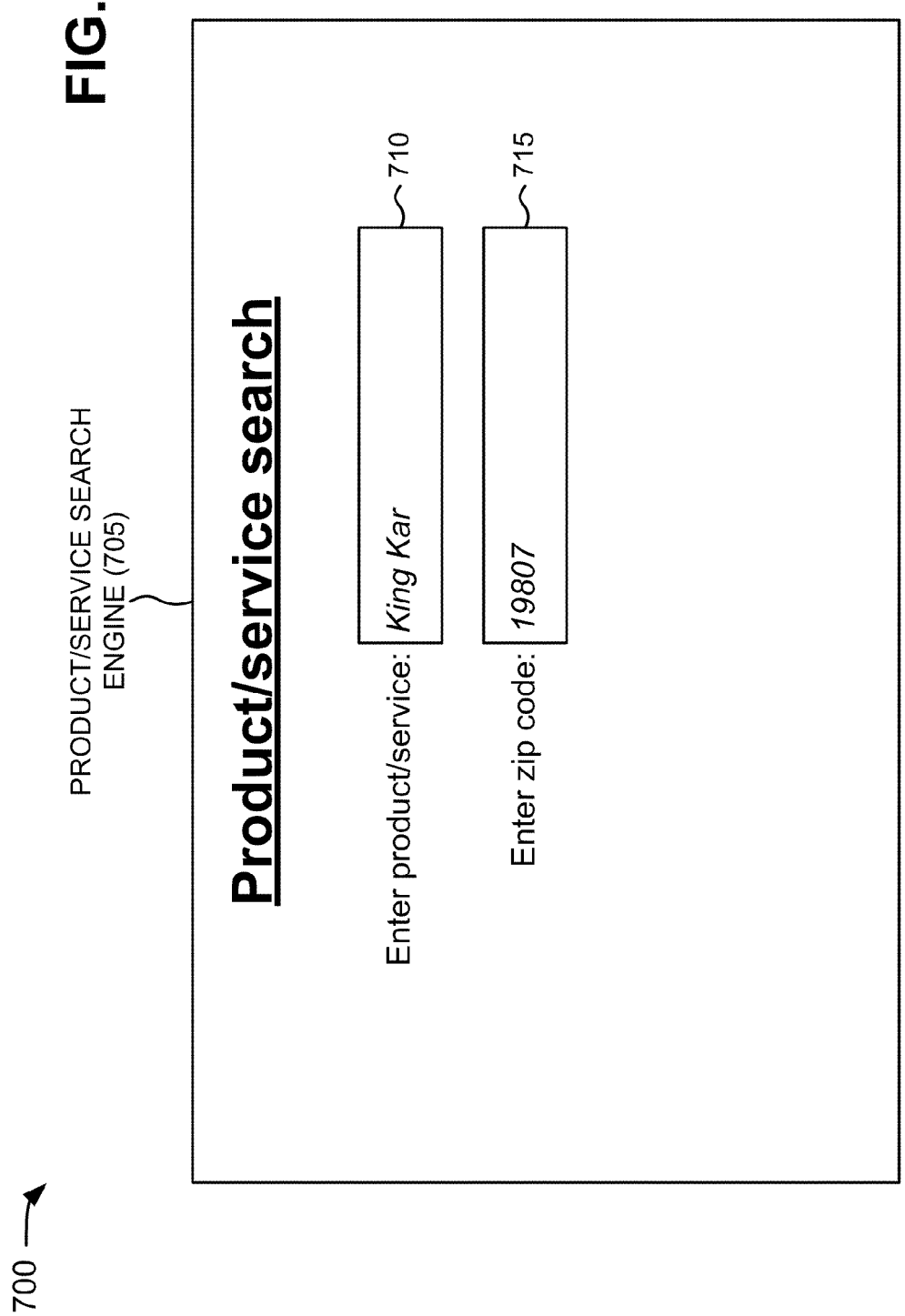

FIG. 7B

INTERACTIVE PRODUCT/
SERVICE LISTING (720)

King Kar dealers in your area

*Joe's King Kar Dealership*

133 Little Road, City, State 19807
(888) 999-7777

*Fred's King Kar Dealership*

43 Beach Street, City, State 19807
(111) 222-3333

*Hank's King Kar Dealership*

567 Oyster Creek Road, City, State 19807
(444) 111-3333

Add Filter ~725

700

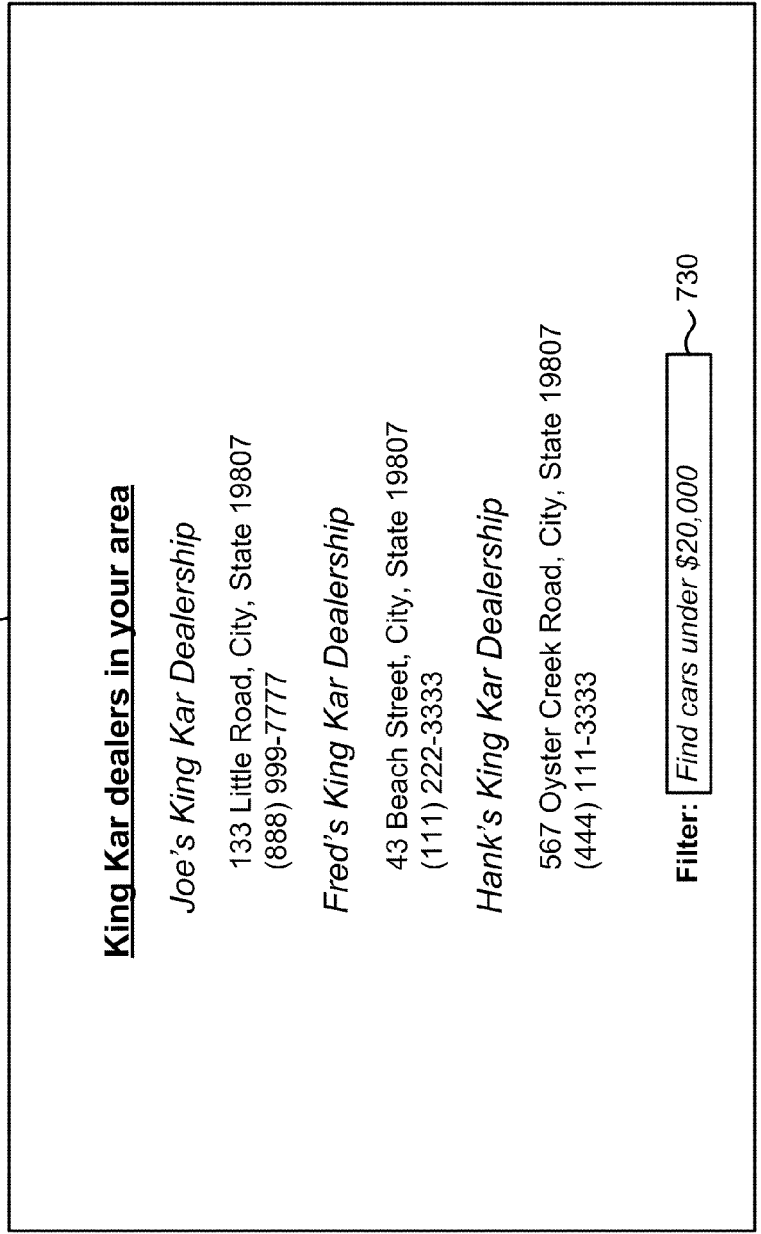

King Kar dealers in your area with cars under $20K

MODIFIED PRODUCT/SERVICE LISTING (735)

*Joe's King Kar Dealership*
133 Little Road, City, State 19807
(888) 999-7777

*Hank's King Kar Dealership*
567 Oyster Creek Road, City, State 19807
(444) 111-3333

740

700

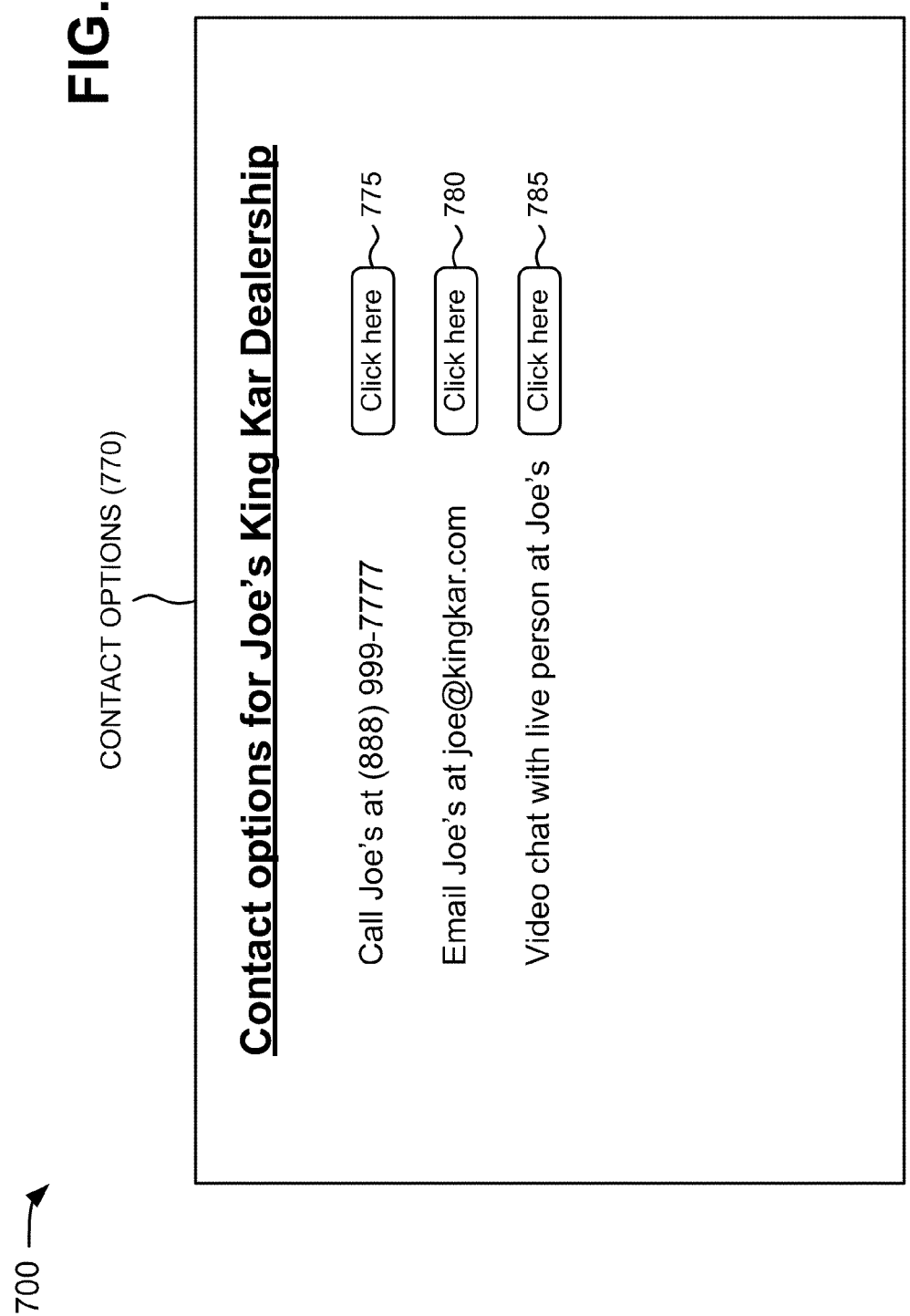

FIG. 8

| Profile Name | Time Period | Content / Commercials | Product / Service Listing |
|---|---|---|---|
| User 1 | 1 | TV Show 1 | Auto dealers |
| | | Commercial 1 | Restaurants |
| | | Commercial 2 | Beer |
| | 2 | TV Show 2 | Shampoo |
| | | Commercial 3 | Linens |
| | | Commercial 4 | Drapes |
| | 3 | TV Show 3 | Lumber |
| | | Commercial 5 | Power tools |
| | | Commercial 6 | Hardware stores |
| User 2 | 1 | TV Show 3 | Lumber |
| | | Commercial 6 | Architects |
| | | Commercial 7 | Contractors |
| | | Commercial 8 | Banks |
| User 3 | *** | *** | *** |

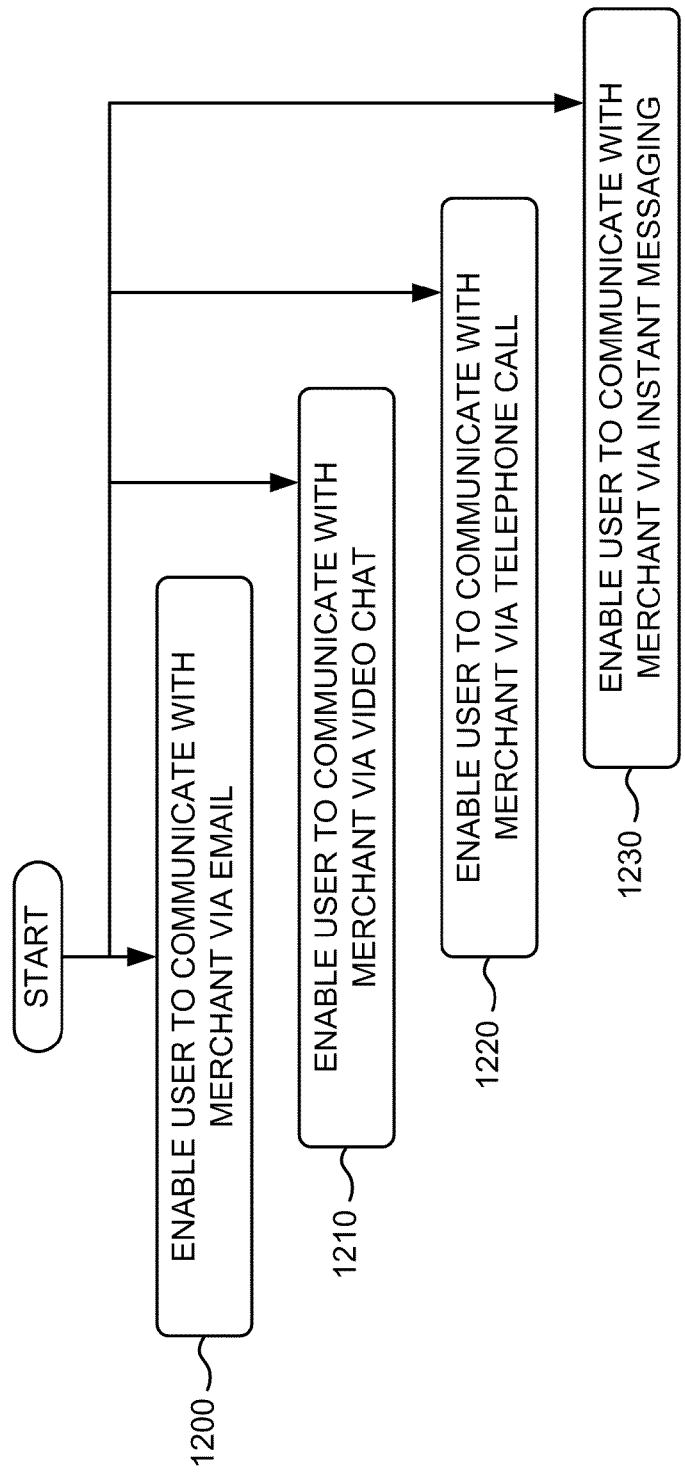

INTERACTIVE PRODUCT / SERVICE LISTING

BACKGROUND

Directory assistance is a telecommunications service used to find out a specific telephone number and/or address of a residence, business, etc. In a typical directory assistance scenario, a user (or caller) may request a telephone number of a residence or business, and a directory assistance system may locate the telephone number and may audibly provide the located telephone number to the caller. Alternatively, the directory assistance system may dial the located telephone number and may connect the caller to the residence or business via the dialed telephone number. In North America, directory assistance may be accessed by dialing "411" or by dialing "1-area code-555-1212" (e.g., to get a listing in a remote or non-local area code). Directory assistance is also available via the Internet, where a user may input a search term and a zip code, and may receive listings of residences, businesses, etc. associated with the search term and located in the zip code.

Many television users (or viewers) regularly watch a number of television (TV) channels that display TV content (e.g., TV shows, pay-per-view (PPV) content, video-on-demand (VOD) content, etc.). One or more commercials may be displayed to the user during the airing of the TV content.

BRIEF DESCRIPTION OF THE DRAWINGS

FIG. 1 is a diagram of an example network in which systems and/or methods described herein may be implemented;

FIG. 2 is a diagram of example components of a set-top box (STB) and/or a content server of the network depicted in FIG. 1;

FIG. 3 is a diagram of example components of a remote control of the network illustrated in FIG. 1;

FIGS. 5A-5G are diagrams of example user interfaces capable of being generated or provided by a television, the STB, and/or the content server of the network depicted in FIG. 1;

FIGS. 7A-7G are diagrams of further example user interfaces capable of being generated or provided by the television, the STB, and/or the content server of FIG. 1;

FIG. 8 is a diagram of a portion of an example database capable of being provided in and/or managed by the STB and/or the content server of FIG. 1;

FIGS. 10-12 are flow charts of another example process for providing an interactive product/service listing to a TV viewer according to implementations described herein.

DETAILED DESCRIPTION OF PREFERRED EMBODIMENTS

Figure 4A:
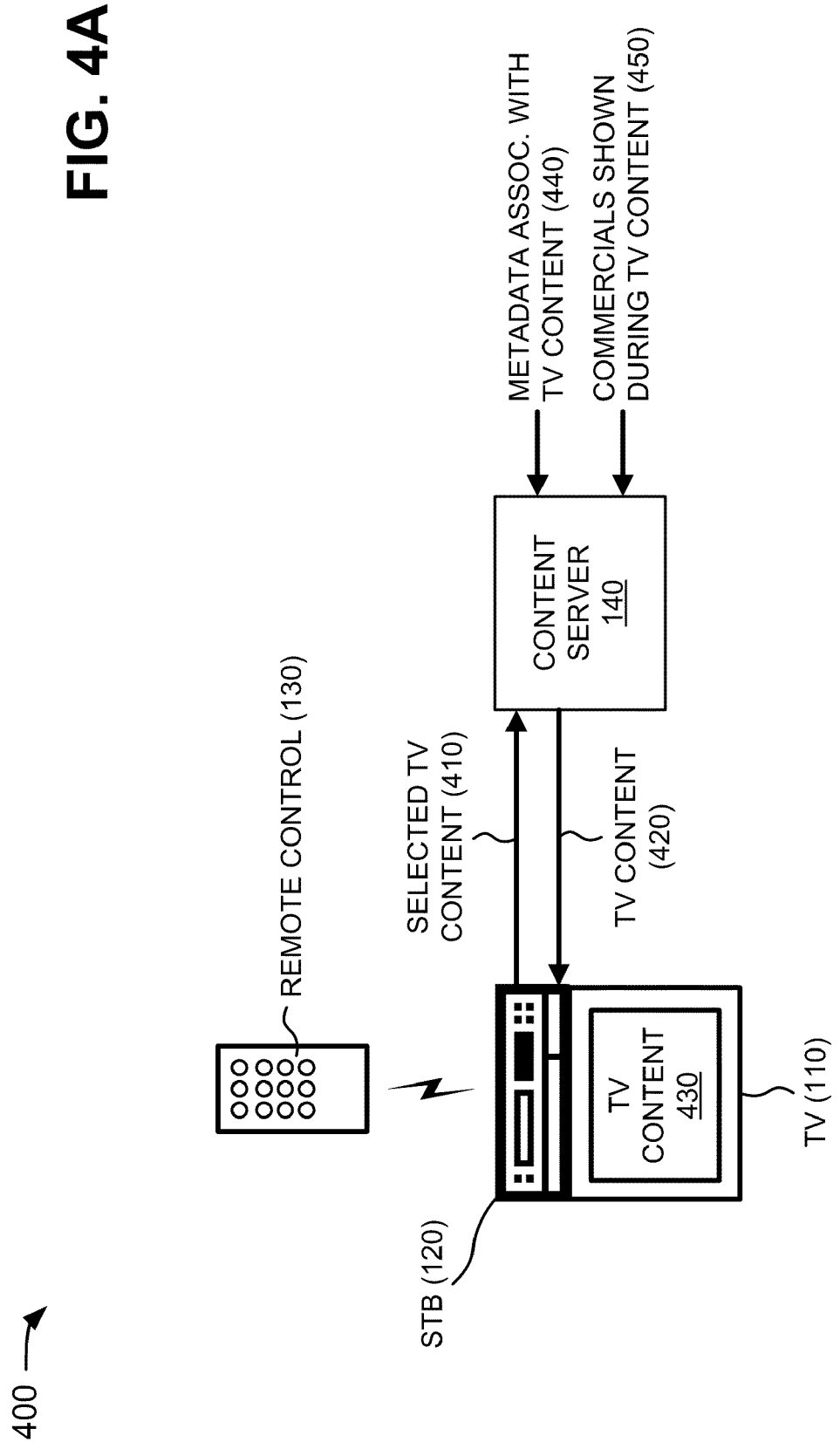
FIGS. 4A and 4B are diagrams of example interactions between components of an example portion of the network illustrated in FIG. 1.

The following detailed description refers to the accompanying drawings. The same reference numbers in different drawings may identify the same or similar elements. Also, the following detailed description does not limit the invention.

Systems and/or methods described herein may provide an interactive product/service listing to a TV viewer based on TV content and/or commercials viewed by the viewer during a particular time period. In one implementation, for example, the systems and/or methods may receive selection of TV content from a device associated with a user, and may track metadata associated with the TV content for a time period. The systems and/or methods may track, for the time period, commercials provided during display of the TV content, and may determine an interactive product/service listing based on the tracked metadata and commercials. The systems and/or methods may provide the interactive product/service listing to the device. When the user selects an item from the interactive product/service listing, the device may interact with a merchant associated with the selected item. Such an arrangement may provide a passive marketplace for merchants to provide responses to the user's interest via a television framework. The user may modify, via the television framework, the interactive product/service listing based on user preferences and/or other constraints.

A "product," as the term is used herein, is to be broadly interpreted to include anything that may be marketed or sold as a commodity or a good. For example, a product may include gas, bread, coffee, bottled water, milk, soft drinks, pet food, beer, fuel, meat, fruit, automobiles, etc.

A "service," as the term is used herein, is to be broadly interpreted to include any act or variety of work done for others (e.g., for compensation). For example, a service may include a repair service (e.g., for a product), a warranty (e.g., for a product), telecommunication services (e.g., telephone services, Internet services, network services, radio services, television services, video services, etc.), an automobile service (e.g., for selling automobiles), a food service (e.g., a restaurant), etc.

As used herein, the terms "customer," "viewer," and/or "user" may be used interchangeably. Also, the terms "customer," "viewer," and/or "user" are intended to be broadly interpreted to include a STB, a remote control, and/or a television or a user of a STB, remote control, and/or television.

FIG. 1 is a diagram of an example network 100 in which systems and/or methods described herein may be implemented. As illustrated, network 100 may include a television (TV) 110, a STB 120, a remote control 130, and a content server 140 interconnected by a network 150. Components of network 100 may interconnect via wired and/or wireless connections. A single television 110, STB 120, remote control 130, content server 140, and network 150 have been illustrated in FIG. 1 for simplicity. In practice, there may be more televisions 110, STBs 120, remote controls 130, content servers 140, and/or networks 150.

Television 110 may include a television monitor that is capable of displaying television programming, content provided by STB 120, and/or content provided by other devices (e.g., a digital video disk (DVD) player, a video camera, etc., not shown) connected to television 110.

STB 120 may include a device that receives television programming (e.g., from content server 140), and provides the television programming to television 110 or another device. STB 120 may allow a user to alter the television programming provided to television 110 based on a signal (e.g., a channel up or channel down signal) from remote control 130. STB 120 may record video in a digital format to a disk drive or other memory medium within STB 120. In one example implementation, STB 120 may be incorporated directly within television 110 and/or may include a digital video recorder (DVR). In another implementation, television 110 and STB 120 may be replaced with a computing device, such as a personal computer, a laptop computer, a tablet computer, etc.

Remote control 130 may include a device that allows a user to control television programming and/or content displayed on television 110 via interaction with television 110 and/or STB 120. For example, remote control 130 may alter television programming provided to television 110 via user selection of a channel up or channel down button of remote control 130. Further details of remote control 130 are provided below in connection with, for example, FIG. 3.

Content server 140 may include one or more server devices, or other types of computation or communication devices, that gather, process, search, and/or provide information in a manner described herein. In one implementation, content server 140 may include a computer system, an application, a cable head-end, and/or a broadcasting device capable of providing content (e.g., VOD content, high definition (HD)-VOD content, TV programming, movies, on-demand services, live television, etc.), commercials, advertisements, instructions, and/or other information to STB 120. Further details of content server 140 are provided below in connection with, for example, FIGS. 4A, 4B, and 6.

Network 150 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks.

Although FIG. 1 shows example components of network 100, in other implementations, network 100 may contain fewer components, different components, differently arranged components, and/or additional components than those depicted in FIG. 1. In still other implementations, one or more components of network 100 may perform one or more other tasks described as being performed by one or more other components of network 100.

FIG. 2 is an example diagram of a device 200 that may correspond to STB 120 and/or content server 140. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include one or more random access memories (RAMs) or other types of dynamic storage devices that may store information and instructions for execution by processing unit 220. ROM 240 may include one or more ROM devices or other types of static storage devices that may store static information and/or instructions for use by processing unit 220. Storage device 250 may include a magnetic and/or optical recording medium and its corresponding drive.

Input device 260 may include a mechanism that permits a user to input information to device 200, such as a keyboard, a mouse, a pen, a microphone, voice recognition and/or biometric mechanisms, a remote control, a touch screen, etc. Output device 270 may include a mechanism that outputs information to the user, including a display, a printer, a speaker, etc. Communication interface 280 may include any transceiver-like mechanism that enables device 200 to communicate with other devices, networks, and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, and/or additional components than depicted in FIG. 2. In still other implementations, one or more components of device 200 may perform one or more other tasks described as being performed by one or more other components of device 200.

FIG. 3 depicts example components of remote control 130. As shown, remote control 130 may include a first set 300 of control buttons and a second set 310 of control buttons. Although FIG. 3 shows control buttons associated with remote control 130, in other implementations, remote control 130 may include a touch screen display (or other input mechanisms) and may omit the control buttons. The touch screen display may be configured to display images of control buttons (e.g., similar to the control buttons provided in FIG. 3) and to receive a user input when the user touches the touch screen display. For example, the user may provide an input to the touch screen display directly, such as via the user's finger, or via other input objects, such as a stylus. User inputs received via the touch screen display may be processed by components and/or devices operating in remote control 130. The touch screen display may permit the user to interact with remote control 130 in order to cause remote control 130 to perform one or more operations.

First set 300 of control buttons may include one or more control buttons that cause remote control 130 to perform one or more operations. For example, first set 300 of control buttons may cause remote control 130 to transmit one or more signals (e.g., to STB 120) representative of the one or more operations. As shown in FIG. 3, first set 300 of control buttons may include a power button (e.g., to cause, when selected by a user, remote control 130 to transmit a signal instructing a device (e.g., STB 120) to power on or power off); a digital video recorder (DVD) button (e.g., to cause, when selected by a user, remote control 130 to transmit a signal instructing a DVD player (not shown) to perform an operation); an auxiliary (AUX) button (e.g., to cause, when selected by a user, remote control 130 to transmit a signal instructing an auxiliary device (e.g., a stereo) to perform an operation); a TV button (e.g., to cause, when selected by a user, remote control 130 to transmit a signal instructing television 110 to perform an operation); and a STB button (e.g., to cause, when selected by a user, remote control 130 to transmit a signal instructing STB 120 to perform an operation).

As further shown in FIG. 3, first set 300 of control buttons may include a menu button, a guide button, and an information (Info) button. The menu button, when selected by a user, may cause remote control 130 to transmit a signal instructing STB 120 to display (e.g., on television 110) a television menu (e.g., a menu that provides access to features associated with a television service). The guide button, when selected by a user, may cause remote control 130 to transmit a signal instructing STB 120 to display (e.g., on television 110) a television guide (e.g., an interactive programming guide, a listing of all available television channels, etc.). The information button, when selected by a user, may cause remote control 130 to transmit a signal instructing STB 120 to display (e.g., on television 110) information about a currently displayed television program.

Second set 310 of control buttons may include one or more control buttons that cause remote control 130 to perform one or more operations. For example, second set 310 of control buttons may cause remote control 130 to transmit one or more signals (e.g., to STB 120) representative of the one or more operations. As shown in FIG. 3, second set 310 of control buttons may include an exit button (e.g., to cause, when selected by a user, remote control 130 to transmit a signal instructing STB 120 to resume a television program currently being watched); an options button (e.g., to cause, when selected by a user, remote control 130 to transmit a signal instructing STB 120 to display extra options or a help menu); a features button (e.g., to cause, when selected by a user, remote control 130 to transmit a signal instructing STB 120 to access local traffic, weather, and other information); and an OnDemand button (e.g., to cause, when selected by a user, remote control 130 to transmit a signal instructing STB 120 to access VOD, HD-VOD, on-demand services, etc.).

As further shown in FIG. 3, second set 310 of control buttons may include an up arrow button 320, a right arrow button 330, a down arrow button 340, a left arrow button 350, an OK button 360, and a "411" widget button 370. Arrow buttons 320-350 may permit a user (e.g., via remote control 130) to navigate through a menu displayed by STB 120 (e.g., via television 110). OK button 360 may permit a user (e.g., via remote control 130) to select an item of a menu displayed by STB 120 (e.g., via television 110). "411" widget button 370, when selected by a user, may cause remote control 130 to transmit a signal instructing STB 120 to access an interactive product/service list (e.g., defined based on TV content and/or commercials viewed by the user) and display the interactive product/service list on television 110. Examples of accessing and navigating an interactive product/service list (e.g., via arrow buttons 320-350, OK button 360, and/or "411" widget button 370) are provided below in connection with the user interfaces depicted in FIGS. 5A-5G and 7A-7G.

Remote control 130 may also include a channel button 380 (e.g., with an up channel portion 382 and a down channel portion 384) and a volume button 390. Channel button 380, when selected by a user, may cause remote control 130 to transmit a signal instructing STB 120 to select a next higher or lower channel for display on television 110. Volume button 390, when selected by a user, may cause remote control 130 to transmit a signal instructing STB 120 to increase or decrease a volume associated with content being displayed on television 110.

Although FIG. 3 shows example components of remote control 130, in other implementations, remote control 130 may contain fewer components, different components, differently arranged components, and/or additional components than depicted in FIG. 3. In still other implementations, one or more components of remote control 130 may perform one or more other tasks described as being performed by one or more other components of remote control 130.

Figure 4B:
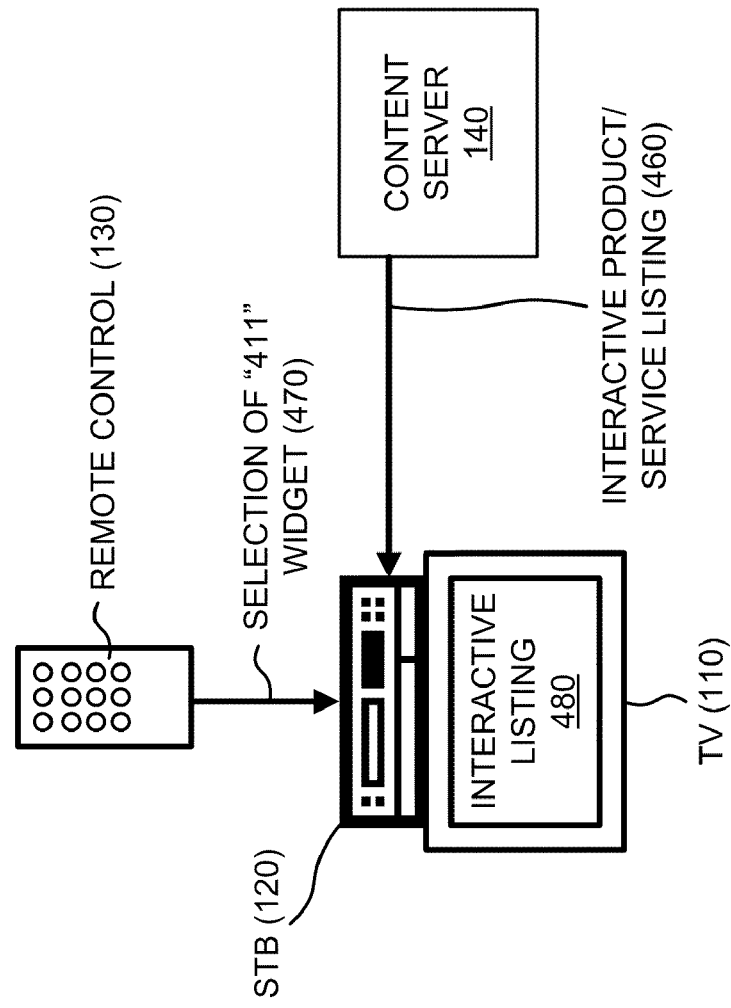

FIGS. 4A and 4B are diagrams of example interactions between components of an example portion 400 of network 100. As illustrated, example network portion 400 may include television 110, STB 120, remote control 130, and content server 140. Television 110, STB 120, remote control 130, and content server 140 may include the features described above in connection with one or more of FIGS. 1-3.

A user (not shown) may utilize remote control 130 to select TV content to be provided on television 110. For example, the user may use channel button 380 of remote control 130 to select (e.g., via STB 120) a channel to be displayed on television 110. STB 120 may receive the user's selection, and may provide a selected TV content signal 410 to content server 140, as shown in FIG. 4A. Content server 140 may receive selected TV content signal 410, and may provide the selected TV content 420 to STB 120 (e.g., based on signal 410). STB 120 may receive TV content 420, and may provide TV content 420 to television 110. Television 110 may receive TV content 420, and may display TV content 420 (e.g., on its screen), as indicated by reference number 430. Television 110 may also display commercials shown during the airing of TV content 420.

As further shown in FIG. 4A, content server 140 may receive metadata 440 associated with TV content 420 from a database associated with content server 140 and/or external sources. Metadata 440 may include information (e.g., a description, a subject heading, a file format, an author/producer, a rights holder, a program title, actors, and/or other data) that accompanies TV content 420. In one implementation, metadata 440 may enable TV content 420 to be more easily indexed, catalogued, searched, and/or retrieved. Alternatively, or additionally, content server 140 may receive information 450 associated with (or related to) commercials shown during provision of TV content 420. Information 450 may include commercial information, advertisement information, and/or metadata (e.g., a commercial title, a commercial author/producer, a commercial rights holder, etc.) associated with such information. In one implementation, content server 140 may collect metadata 440 and/or information 450 for a particular time period (e.g., thirty minutes, one hour, etc.), and may associate metadata 440 and/or information 450 with a particular user. For example, if the user identifies himself/herself (e.g., via interaction with STB 120), content server 140 may associate metadata 440 and/or information 450 with the identified user. In another implementation, the particular time period may be defined by the user.

With reference to FIG. 4B, content server 140 may determine an interactive product/service listing 460 based on the collected metadata 440 and/or information 450. Interactive product/service listing 460 may include a listing of products and/or services associated with metadata 440 and/or information 450. For example, if the user is watching a home improvement show (e.g., TV content 420) and commercials about a restaurant and power tools are provided during the viewing of the home improvement show, interactive product/service listing 460 may include a list of restaurants and hardware stores within a particular distance from the location of the user (e.g., as determined by the location of STB 120). Content server 140 may provide interactive product/service listing 460 to STB 120. If the user selects "411" widget button 370 of remote control 130 (or utilizes another selection mechanism displayed on television 110), as indicated by reference number 470, STB 120 may provide interactive product/service listing 460 to television 110. Television 110 may receive interactive product/service listing 460, and may display interactive product/service listing 460 (e.g., on its screen), as indicated by reference number 480.

The user (e.g., via STB 120 and remote control 130) may navigate interactive product/service listing 460 (e.g., displayed on television 110). For example, when the user selects (e.g., via STB 120 and remote control 130) an item from interactive product/service listing 460, STB 120 may interact with a merchant associated with the selected item. Such an arrangement may provide a passive marketplace for merchants to provide responses to the user's interest via a television-based framework. In one implementation, the user may modify (e.g., via STB 120 and remote control 130) interactive product/service listing 460 based on user preferences and/or other constraints. For example, the user may filter the number of products and/or services provided in interactive product/service listing 460 (e.g., based on a filter criteria).

Although FIGS. 4A and 4B show example components of network portion 400, in other implementations, network portion 400 may contain fewer components, different components, differently arranged components, and/or additional components than depicted in FIGS. 4A and 4B. In still other implementations, one or more components of network portion 400 may perform one or more other tasks described as being performed by one or more other components of network portion 400. For example, in one implementation, some or all of the operations described as being performed by content server 140 may be performed by STB 120 alone or together with content server 140.

FIGS. 5A-5G are diagrams of example user interfaces capable of being generated or provided by television 110, STB 120, and/or content server 140. Each of the user interfaces depicted in FIGS. 5A-5G (as well as the user interfaces depicted in FIGS. 7A-7G, described below) may include a graphical user interface (GUI) or a non-graphical user interface, such as a text-based interface. The user interfaces may provide information to users via a customized interface (e.g., a proprietary interface) and/or other types of interfaces (e.g., a browser-based interface, a television interface, etc.). The user interfaces may receive user inputs via one or more input devices (e.g., remote control 130, input device 260, etc.), may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. The user interfaces may be displayed to a user via one or more output devices (e.g., television 110, output device 270, etc.).

Figure 5A:
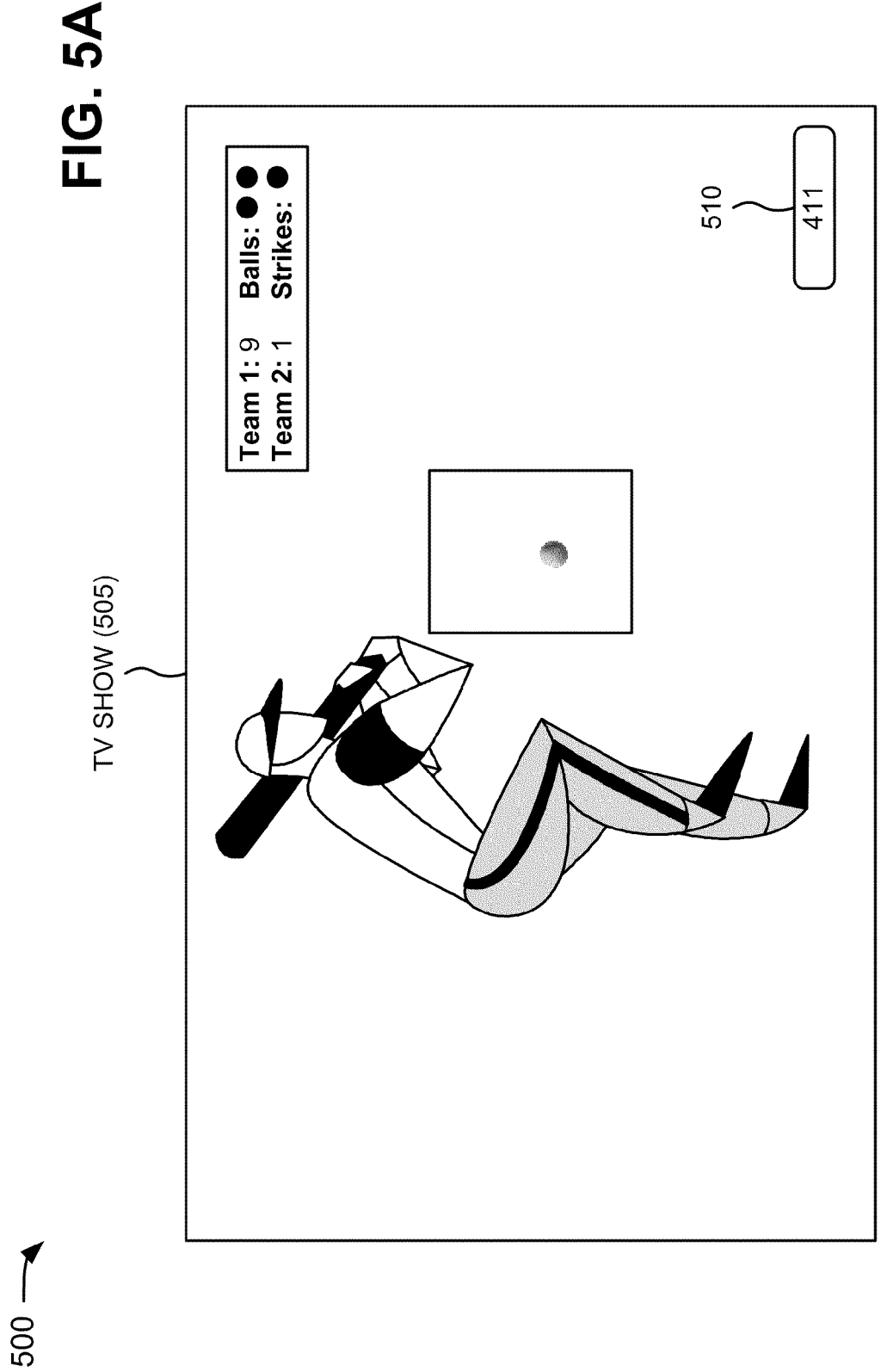

As illustrated in FIG. 5A, a user interface 500 may include a TV show 505 (e.g., a baseball game). For example, as described above in connection with FIGS. 4A and 4B, a user may use channel button 380 of remote control 130 to select (e.g., via STB 120) a channel (e.g., for TV show 505) to be displayed on television 110. STB 120 may receive selection of TV show 505, and may provide selected TV content signal 410 to content server 140. Content server 140 may receive selected TV content signal 410, and may provide TV show 505 to STB 120 (e.g., based on signal 410). STB 120 may receive TV show 505, and may provide TV show 505 to television 110. Television 110 may receive TV show 505, and may display TV show 505 (e.g., on its screen). In one implementation, metadata (e.g., metadata 440) associated with TV show 505 may be provided to content server 140 (e.g., and associated with the user). As further shown in FIG. 5A, user interface 500 may include a "411" selection mechanism 510 (e.g., an icon, a button, or some other type of selection mechanism). "411" selection mechanism 510, when selected by a user, may instruct STB 120 to access an interactive product/service list (e.g., defined based on TV content and/or commercials viewed by the user) and display the interactive product/service list on television 110.

Figure 5B:
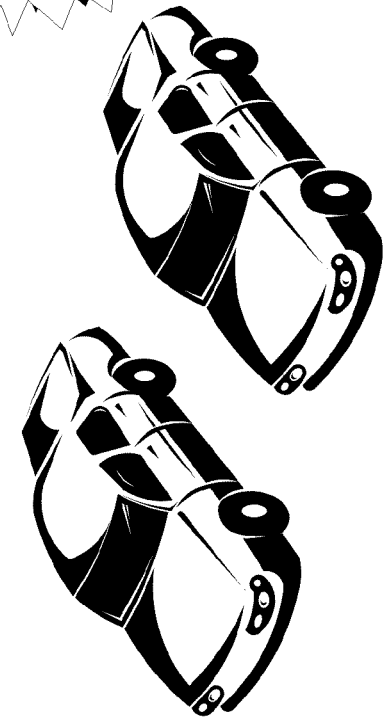
Figure 5C:

As shown in FIGS. 5B and 5C, user interface 500 may display a first commercial 515 and a second commercial 520 to the user during viewing of TV show 505. First commercial 515 may include, for example, a commercial for an automobile dealership (e.g., "Bob Smith's Auto Mart"). Second commercial 520 may include, for example, a commercial for a restaurant (e.g., "Joe's Burger Joint"). In one implementation, information (e.g., information 450) associated with commercials 515 and 520 may be provided to content server 140. Content server 140 may determine an interactive product/service listing (e.g., interactive product/service listing 460) based on metadata (e.g., metadata 440) associated with TV show 505 and/or information (e.g., information 450) associated with commercials 515 and 520, and may provide the determined interactive product/service listing to STB 120.

As shown in FIG. 5D, user interface 500 may display TV show 505 after first commercial 515 and second commercial 520 are displayed. The user (e.g., via remote control 130) may select or highlight "411" selection mechanism 510, as indicated by reference number 525. When "411" selection mechanism 510 is selected, user interface 500 may display an interactive product/service listing 530, as shown in FIG. 5E. Interactive product/service listing 530 may include a listing of products and/or services associated with metadata (e.g., metadata 440) associated with TV show 505 and/or information (e.g., information 450) associated with commercials 515 and 520. For example, since first commercial 515 related to an automobile dealership, interactive product/service listing 530 may include listings or items 535 for automobile dealers in a geographical area near the user. In another example, since second commercial 520 related to restaurants, interactive product/service listing 530 may include listings or items 540 for restaurants in a geographical area near the user.

Figure 5F:
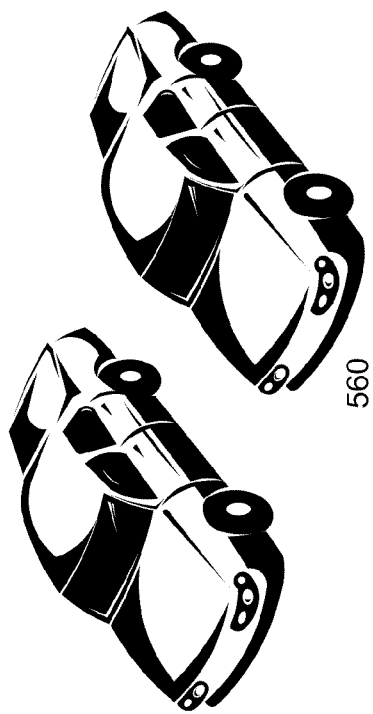

As further shown in FIG. 5E, the user may select (e.g., via a pointer mechanism 545 controlled by remote control 130) an item from interactive product/service listing 530. For example, if the user selects (e.g., via pointer mechanism 545) an item (e.g., "Fred's Auto Dealer") from listing 535, user interface 500 may display a listing 550 for the selected item, as shown in FIG. 5F. Selected listing 550 may include, for example, information (e.g., an address, a telephone number, etc.) associated with Fred's Auto Dealer, a mechanism 555 (e.g., a button, an icon, etc.) for connecting to Fred's Auto Dealer, a mechanism 560 (e.g., a button, an icon, etc.) for viewing products and/or services provided by Fred's Auto Dealer, and a mechanism 565 (e.g., a button, an icon, etc.) for searching inventory provided by Fred's Auto Dealer. If the user selects (e.g., via remote control 130) mechanism 555, the user (e.g., via television 110 and STB 120) may be connected to Fred's Auto Dealer (e.g., via email, via an Internet protocol (IP)-based telephone call, via video chat, via instant messaging, etc.). If the user selects (e.g., via remote control 130) mechanism 560, the user (e.g., via television 110 and STB 120) may be presented with products and/or services provided by Fred's Auto Dealer (e.g., repair services, warranties, leasing options, etc.). If the user selects (e.g., via remote control 130) mechanism 565, the user (e.g., via television 110 and STB 120) may be presented a search engine so that the user may search inventory provided by Fred's Auto Dealer (e.g., cars, trucks, motorcycles, etc.).

In another example, if the user selects (e.g., via pointer mechanism 545) an item (e.g., "Guido's Italian Bistro") from listing 540, user interface 500 may display a listing 570 for the selected item, as shown in FIG. 5G. Selected listing 570 may include, for example, information (e.g., an address, a telephone number, etc.) associated with Guido's Italian Bistro, a mechanism 575 (e.g., a button, an icon, etc.) for connecting to Guido's Italian Bistro, a mechanism 580 (e.g., a button, an icon, etc.) for viewing a menu provided by Guido's Italian Bistro, and a mechanism 585 (e.g., a button, an icon, etc.) for purchasing food provided by Guido's Italian Bistro. If the user selects (e.g., via remote control 130) mechanism 575, the user (e.g., via television 110 and STB 120) may be connected to Guido's Italian Bistro (e.g., via email, via an IP-based telephone call, via video chat, via instant messaging, etc.). If the user selects (e.g., via remote control 130) mechanism 580, the user (e.g., via television 110 and STB 120) may be presented with a menu provided by Guido's Italian Bistro. If the user selects (e.g., via remote control 130) mechanism 585, the user (e.g., via television 110 and STB 120) may be presented a user interface so that the user may purchase food provided by Guido's Italian Bistro.

Although user interfaces 500 depict a variety of information, in other implementations, user interfaces 500 may depict less information, different information, differently arranged information, and/or additional information than depicted in FIGS. 5A-5G.

Figure 6:
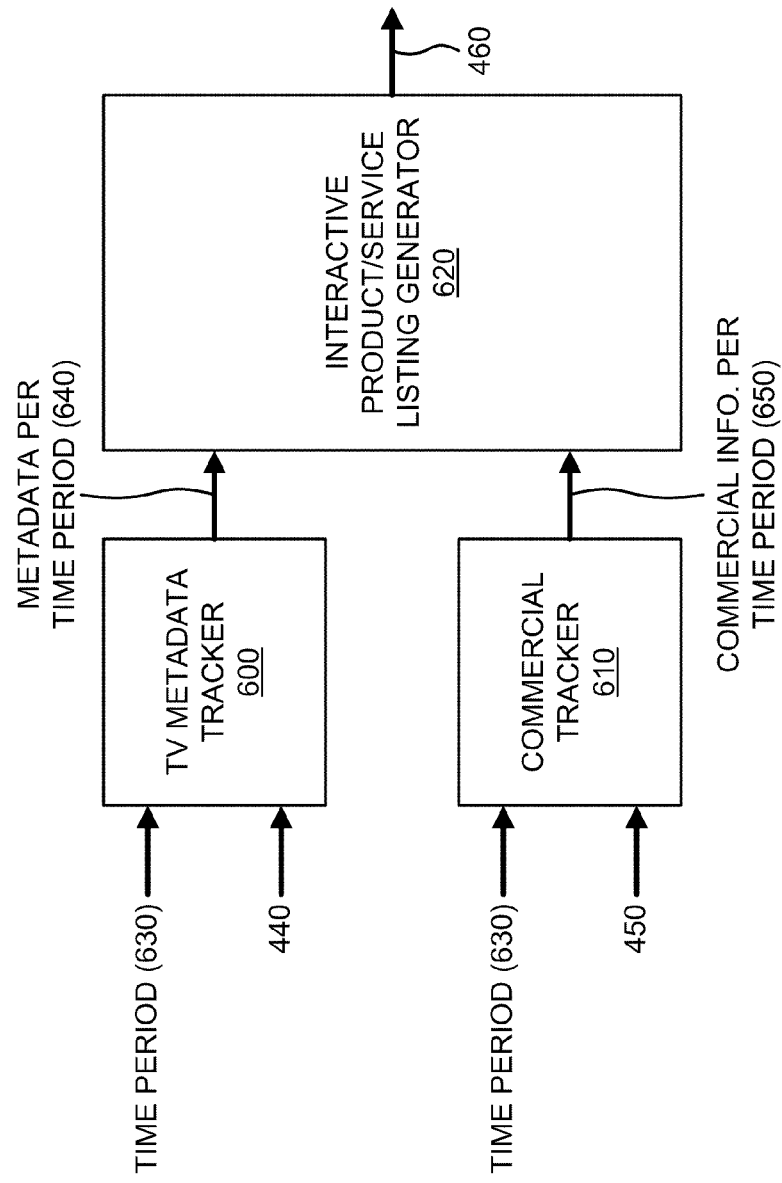
FIG. 6 is a diagram of example functional components of the content server of FIG. 1.

FIG. 6 is a diagram of example functional components of content server 140. In one implementation, the functions described in connection with FIG. 6 may be performed by one or more components of device 200 (FIG. 2). As shown in FIG. 6, content server 140 may include a TV metadata tracker 600, a commercial tracker 610, and an interactive product/service listing generator 620.

TV metadata tracker 600 may include hardware or a combination of hardware and software that may receive metadata 440 (e.g., associated with TV content 420) from a database associated with content server 140 and/or from external sources (e.g., an owner of TV content 420). TV metadata tracker 600 may also receive a time period 630 (e.g., from a user if time period is user-configurable). Time period 630 may include a particular time period (e.g., thirty minutes, one hour, etc.), a time period associated with the airing of TV content 420, a time period during which STB 120 is receiving content from content server 140, etc. TV metadata tracker 600 may determine metadata 640 per time period based on metadata 440 and time period 630, and may provide metadata 640 per time period to interactive product/service listing generator 620. Metadata 640 per time period may include metadata 440 provided to content server 140 during time period 630.

Commercial tracker 610 may include hardware or a combination of hardware and software that may receive information 450 associated with commercials (e.g., shown during provision of TV content 420) from external sources (e.g., an owner of information 450). Commercial tracker 610 may also receive time period 630 (e.g., from a user if time period is user-configurable). Commercial tracker 600 may determine commercial information 650 per time period based on information 450 and time period 630, and may provide commercial information 650 per time period to interactive product/service listing generator 620. Commercial information 650 per time period may include information 450 provided to content server 140 during time period 630.

Interactive product/service listing generator 620 may include hardware or a combination of hardware and software that may receive metadata 640 per time period from TV metadata tracker 600, and may receive information 650 per time period from commercial tracker 610. Interactive product/service listing generator 620 may determine interactive product/service listing 460 based on metadata 640 per time period and information 650 per time period, and may provide interactive product/service listing 460 to STB 120.

Although FIG. 6 shows example functional components of content server 140, in other implementations, content server 140 may contain fewer functional components, different functional components, differently arranged functional components, and/or additional functional components than depicted in FIG. 6. In still other implementations, one or more functional components of content server 140 may perform one or more other tasks described as being performed by one or more other functional components of content server 140.

Figure 7D:

FIGS. 7A-7G are diagrams of further example user interfaces 700 capable of being generated or provided by television 110, STB 120, and/or content server 140. In one implementation, one or more of user interfaces 700 may be provided to a user when the user selects "411" widget button 370 (FIG. 3) of remote control 130. Selection of "411" widget button 370 may cause remote control 130 to transmit a signal instructing STB 120 to present a user interface 700 for a product/service search engine 705, as shown in FIG. 7A. Product/service search engine 705 may include a mechanism 710 (e.g., a text input box) for inputting a product and/or service, and a mechanism 715 (e.g., a text input box) for inputting a zip code associated with the user. For example, the user may input (e.g., via remote control 130) "King Kar" in mechanism 710 and may input "19807" in mechanism 715.

Once the user inputs information in mechanisms 710 and/or 715 (or when the user selects OK button 360 on remote control 130), STB 120 may provide the input information to content server 140. Content server 140 may receive the input information, may perform a search of products and/or services (e.g., provided in a database associated with content server 140) based on the input information, and may generate an interactive product/service listing 720 based on the search. Interactive product/service listing 720 may include a listing of products and/or services that match the input information (e.g., search criteria). Content server 140 may provide interactive product/service listing 720 to STB 120 and STB 120 may display (e.g., via television 110) interactive product/service listing 720, as shown in FIG. 7B. For example, as shown in FIG. 7B, interactive product/service listing 720 may include a listing of King Kar dealers (e.g., "Joe's King Kar Dealership," "Fred's King Kar Dealership," and "Hank's King Kar Dealership") in the zip code (e.g., "19807") provided by the user. In one implementation, the user may request assistance with the search performed by content server 140 on the input information. In such an implementation, STB 120 and/or content server 140 may request that a live person (e.g., an agent) continue the search and generate additional (or different) search results for interactive product/service listing 720. The agent may provide the additional (or different) search results to STB 120 for display on television 110 to the user. Such multi-modal directory assistance may further enhance the user's experience.

As further shown in FIG. 7B, user interface 700 may include a mechanism 725 (e.g., a button, an icon, etc.) for adding a filter to interactive product/service listing 720. In one implementation, the filter may enable the user to modify (e.g., filter, limit, etc.) the information provided in interactive product/service listing 720. If the user selects (e.g., via remote control 130) mechanism 725, user interface 700 may display a filter text input mechanism 730, as shown in FIG. 7C. Filter text input mechanism 730 may enable the user to input text that may be used to filter interactive product/service listing 720. For example, as shown in FIG. 7C, the user may attempt to filter (e.g., via filter text input mechanism 730) interactive product/service listing 720 to King Kar dealers that have cars under $20,000. Content server 140 may receive the information input in filter text input mechanism 730, and may modify interactive product/service listing 720 based on the input information. Content server 140 may provide a modified product/service listing 735 to STB 120 and STB 120 may display modified product/service listing 735 on television 110, as shown in FIG. 7D. For example, as shown in FIG. 7D, modified product/service listing 735 may not include Fred's King Kar Dealership (e.g., provided in interactive product/service listing 720), which may indicate that Fred's King Kar Dealership does not have any cars under $20,000.

Figure 7E:
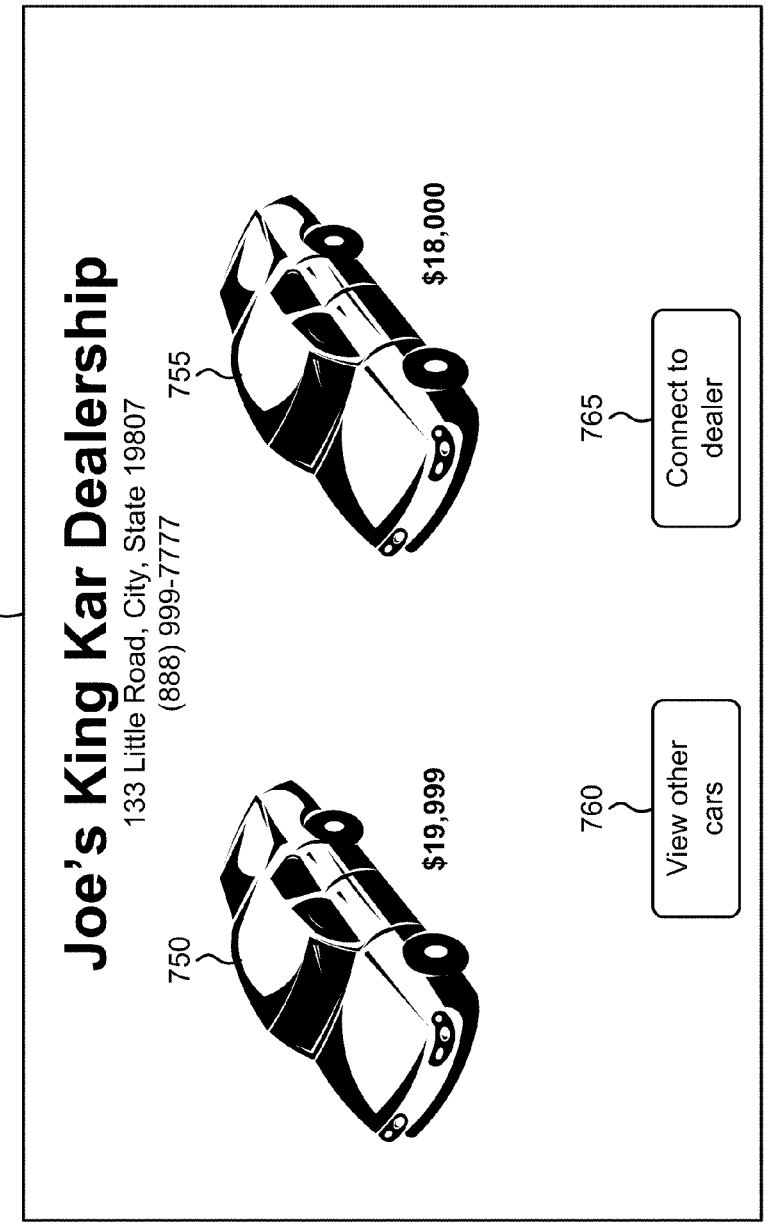

As further shown in FIG. 7D, the user may select (e.g., via a pointer mechanism 740 controlled by remote control 130) an item from modified product/service listing 735. For example, if the user selects (e.g., via pointer mechanism 740) an item (e.g., "Joe's King Kar Dealership") from listing 735, user interface 700 may display a listing 745 for the selected item, as shown in FIG. 7E. Selected listing 745 may include, for example, information (e.g., an address, a telephone number, etc.) associated with Joe's King Kar Dealership, a mechanism 760 (e.g., a button, an icon, etc.) for viewing other cars provided by Joe's King Kar Dealership, and a mechanism 765 (e.g., a button, an icon, etc.) for connecting to Joe's King Kar Dealership. If the user selects (e.g., via remote control 130) mechanism 760, the user (e.g., via television 110 and STB 120) may be presented with other cars provided by Joe's King Kar Dealership. If the user selects (e.g., via remote control 130) mechanism 765, the user (e.g., via television 110 and STB 120) may be connected to Joe's King Kar Dealership (e.g., via email, via an IP-based telephone call, via video chat, via instant messaging, etc.).

Figure 7G:
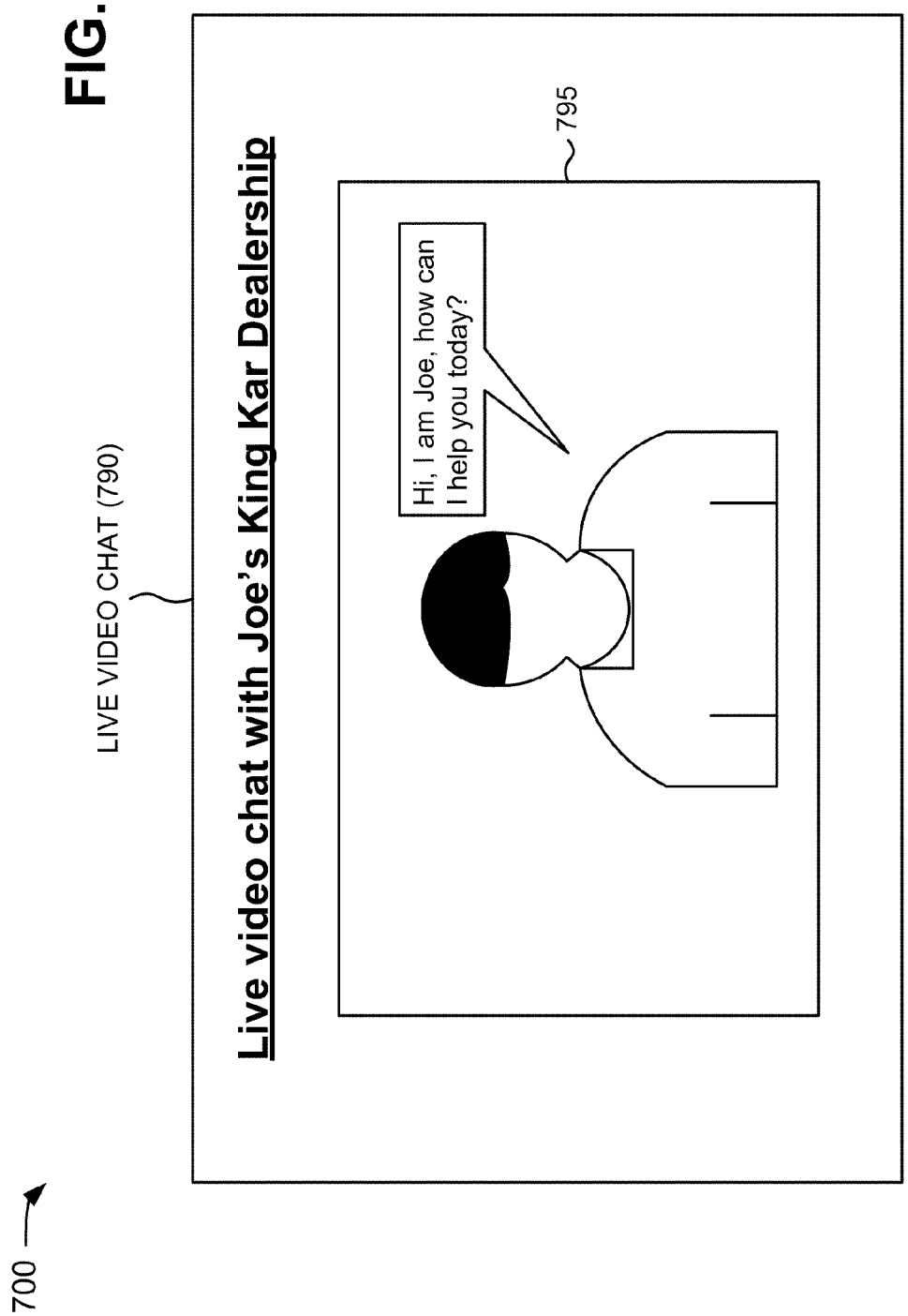

In one implementation, if the user selects (e.g., via remote control 130) mechanism 765, the user (e.g., via television 110 and STB 120) may be presented with contact options 770 for connecting to Joe's King Kar Dealership, as shown in FIG. 7F. For example, contact options 770 may include an option 775 for calling Joe's King Kar Dealership, an option 780 for emailing Joe's King Kar Dealership, and an option 785 for video chatting with a live person at Joe's King Kar Dealership. If the user selects (e.g., via remote control 130) option 775, the user (e.g., via television 110 and STB 120) may place a call to Joe's King Kar Dealership. If the user selects (e.g., via remote control 130) option 780, the user (e.g., via television 110 and STB 120) may write and send an email to Joe's King Kar Dealership. If the user selects (e.g., via remote control 130) option 780, the user (e.g., via television 110 and STB 120) may be presented with a live video chat 790 session with Joe's King Kar Dealership, as shown in FIG. 7G. Live video chat 790 may enable the user to see (e.g., in a window 795) and interact with a representative from Joe's King Kar Dealership. For example, the user may inquire about products and/or services provided by Joe's King Kar Dealership via live video chat 790.

Although user interfaces 700 depict a variety of information, in other implementations, user interfaces 700 may depict less information, different information, differently arranged information, and/or additional information than depicted in FIGS. 7A-7G.

FIG. 8 is a diagram of a portion 800 of an example database capable of being provided in and/or managed by STB 120 and/or content server 140. As illustrated, database portion 800 may include a variety of information associated with users, time periods, TV content and/or commercials, and product/service listings. For example, database portion 700 may include a profile name field 810, a time period field 820, a content/commercials field 830, a product/service listing field 840, and/or a variety of entries 850 associated with fields 810-840.

Profile name field 810 may include information associated with users (e.g., of television 110, STB 120, remote control 130, and/or content server 140), such as user identification, user name, user address, etc. For example, profile name field 810 may include entries for "User 1," "User 2," "User 3," etc. In one example, each entry in profile name field 810 may include an identifier for a user (e.g., an account number, a password, etc.), the user's name, user contact information (e.g., address, telephone number, email address, etc.), etc.

Time period field 820 may include entries 850 providing time periods associated with the users provided in profile name field 810. For example, time period field 820 may include entries 850 for three time periods (e.g., "1," "2," and "3") associated with "User 1," and for a single time period (e.g., "1") associated with "User 2." Each of the time periods provided in time period field 820 may include a particular time period (e.g., thirty minutes, one hour, etc.), a time period associated with the airing of TV content 420, a time period during which STB 120 is receiving content from content server 140, etc.

Content/commercials field 830 may include entries 850 providing information for TV content and/or commercials viewed by the users provided in profile name field 810 (e.g., during the time periods specified in time period field 820). For example, as shown in FIG. 8, during a first time period the first user (e.g., "User 1") may view "TV Show 1," "Commercial 1," and "Commercial 2"; during a second time period the first user may view "TV Show 2," "Commercial 3," and "Commercial 4"; and during a third time period the first user may view "TV Show 3," "TV Show 4," and "Commercial 5."

Product/service listing field 840 may include entries 850 providing information for product/service listings (e.g., interactive product/service listing 460 generated by content server 140) associated with the users provided in profile name field 810. In one implementation, content server 140 may generate entries 850 for product/service listing field 840 based on information contained in content/commercials field 830. For example, with reference to FIG. 8, since the first user (e.g., "User 1") viewed "TV Show 1," "Commercial 1," and "Commercial 2" during the first time period, content server 140 may generate a product/service listing that may include "Auto dealers," "Restaurants," and "Beer" (e.g., as shown in product/service listing field 840). In another example, since the second user (e.g., "User 2") viewed "TV Show 3," "Commercial 6," "Commercial 7," and "Commercial 8" during the first time period, content server 140 may generate a product/service listing that may include "Lumber," "Architects," "Contractors," and "Banks" (e.g., as shown in product/service listing field 840).

Although FIG. 8 shows example information that may be provided in database portion 800, in other implementations, database portion 800 may contain less information, different information, differently arranged information, and/or additional information than depicted in FIG. 8. For example, profile name field 810 may be omitted (e.g., in instances when there is a single user).

Figure 9:
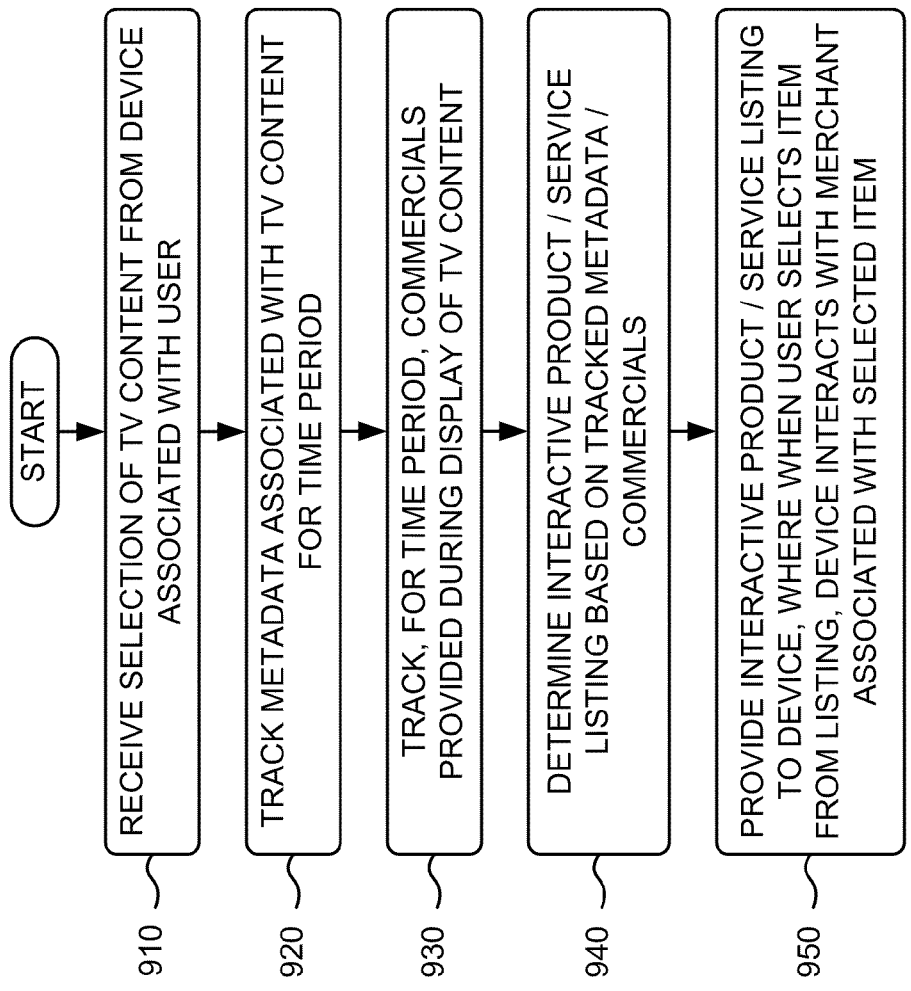
FIG. 9 is a flow chart of an example process for providing an interactive product/service listing to a TV viewer according to implementations described herein.

FIG. 9 is a flow chart of an example process 900 for providing an interactive product/service listing to a TV viewer according to implementations described herein. In one implementation, process 900 may be performed by content server 140. In another implementation, some or all of process 900 may be performed by another device or group of devices, including or excluding content server 140.

As illustrated in FIG. 9, process 900 may include receiving selection of TV content from a device associated with a user (block 910), tracking metadata associated with the TV content for a time period (block 920), and tracking, for the time period, commercials provided during display of the TV content (block 930). For example, in implementations described above in connection with FIG. 4A, a user may utilize remote control 130 to select TV content to be provided on television 110. STB 120 may receive the user's selection, and may provide selected TV content signal 410 to content server 140. Content server 140 may receive selected TV content signal 410, and may provide the selected TV content 420 to STB 120 (e.g., based on signal 410). Content server 140 may receive metadata 440 associated with TV content 420 from a database associated with content server 140 and/or external sources. Metadata 440 may include information (e.g., a description, a subject heading, a file format, an author/producer, a rights holder, a program title, actors, and/or other data) that accompanies TV content 420. Content server 140 may receive information 450 associated with commercials shown during provision of TV content 420. Information 450 may include commercial information, advertisement information, and/or metadata (e.g., a commercial title, a commercial author/producer, a commercial rights holder, etc.) associated with such information. In one example, content server 140 may collect metadata 440 and/or information 450 for a particular time period (e.g., thirty minutes, one hour, etc.).

As further shown in FIG. 9, process 900 may include determining an interactive product/service listing based on the tracked metadata and/or commercials (block 940), and providing the interactive product/service listing to the device, where, when the user selects an item from the listing, the device interacts with a merchant associated with the selected item (block 950). For example, in implementations described above in connection with FIG. 4B, content server 140 may determine interactive product/service listing 460 based on the collected metadata 440 and/or information 450. Interactive product/service listing 460 may include a listing of products and/or services associated with metadata 440 and/or information 450. Content server 140 may provide interactive product/service listing 460 to STB 120. Television 110 may receive interactive product/service listing 460, and may display interactive product/service listing 460 (e.g., on its screen), as indicated by reference number 480. The user (e.g., via STB 120 and remote control 130) may navigate interactive product/service listing 460 (e.g., displayed on television 110). In one example, when the user selects (e.g., via STB 120 and remote control 130) an item from interactive product/service listing 460, STB 120 may interact with a merchant associated with the selected item.

Figure 10:
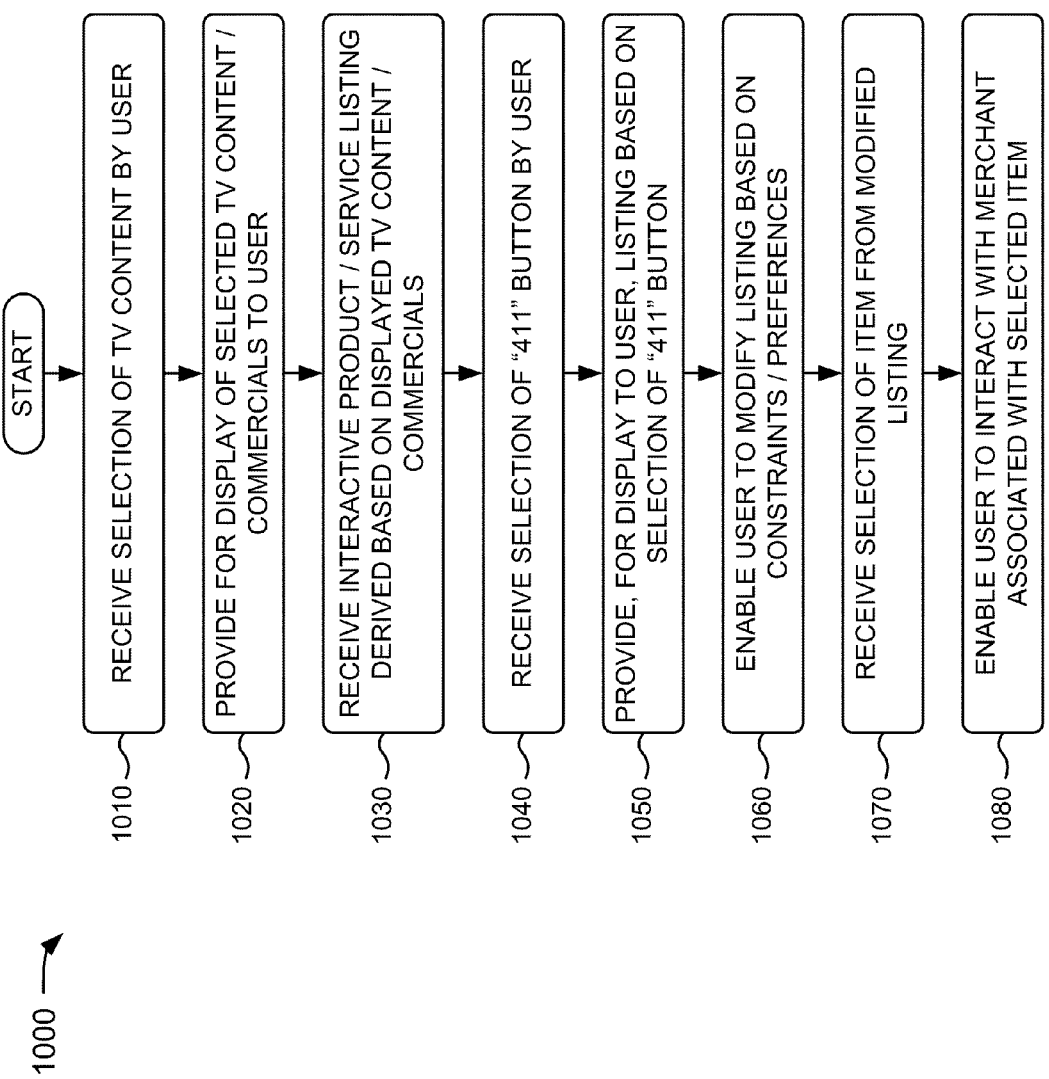
Figure 11:
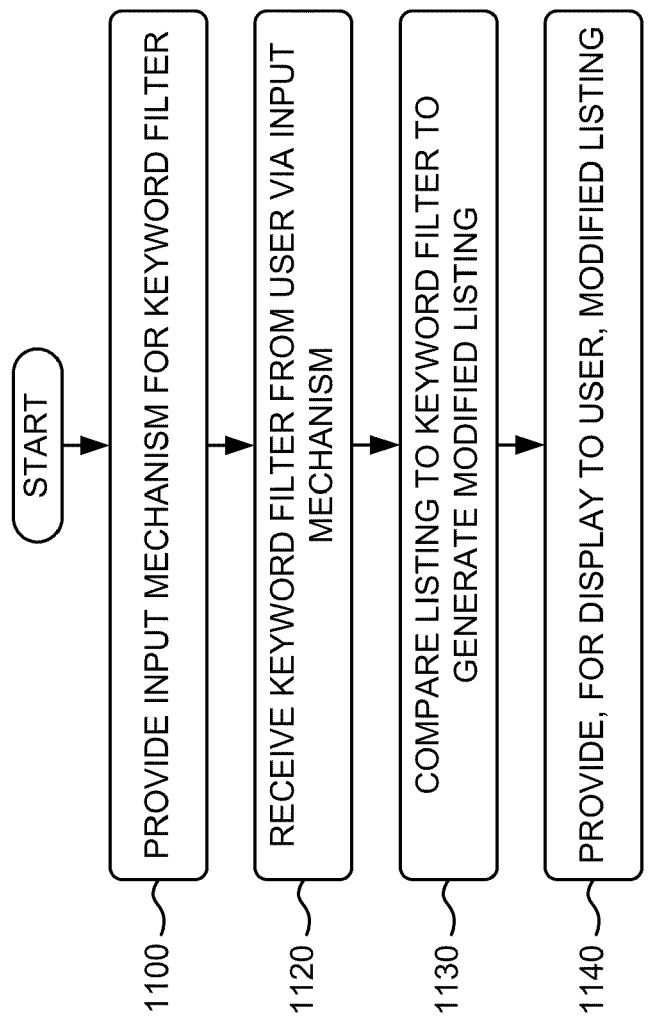

FIGS. 10-12 are flow charts of another example process 1000 for providing an interactive product/service listing to a TV viewer according to implementations described herein. In one implementation, process 1000 may be performed by STB 120. In another implementation, some or all of process 1000 may be performed by another device or group of devices (e.g., television 110), including or excluding STB 120.

As shown in FIG. 10, process 1000 may include receiving selection of TV content by a user (block 1010), providing for display of the selected TV content and commercials to the user (block 1020). For example, in implementations described above in connection with FIG. 4A, a user may utilize remote control 130 to select TV content to be provided on television 110. STB 120 may receive the user's selection, and may provide selected TV content signal 410 to content server 140. Content server 140 may receive selected TV content signal 410, and may provide the selected TV content 420 to STB 120 (e.g., based on signal 410). STB 120 may receive TV content 420, and may provide TV content 420 to television 110. Television 110 may receive TV content 420, and may display TV content 420 (e.g., on its screen), as indicated by reference number 430. Television 110 may also display commercials shown during the airing of TV content 420. The commercials may include linear commercial interruptions (e.g., commercial breaks in TV programming), banner advertisements, banner commercials, banner overlays, etc.

As further shown in FIG. 10, process 1000 may include receiving an interactive product/service listing derived based on the displayed TV content and commercials (block 1030), receiving selection of a "411" button by the user (block 1040), and providing, for display to the user, the interactive product/service listing based on selection of the "411" button (block 1050). For example, in implementations described above in connection with FIG. 4B, content server 140 may provide interactive product/service listing 460 to STB 120, and STB 120 may receive interactive product/service listing 460. If the user selects "411" widget button 370 of remote control 130 (or utilizes another selection mechanism displayed on television 110), as indicated by reference number 470, STB 120 may provide interactive product/service listing 460 to television 110. Television 110 may receive interactive product/service listing 460, and may display interactive product/service listing 460 (e.g., on its screen), as indicated by reference number 480.

Returning to FIG. 10, process 1000 may include enabling the user to modify the interactive product/service listing based on constraints and/or preferences (block 1060), receiving selection of an item from the modified interactive product/service listing (block 1070), and enabling the user to interact with a merchant associated with the selected item (block 1080). For example, in implementations described above in connection with FIGS. 7C-7E, filter text input mechanism 730 may enable the user to input text that may be used to filter interactive product/service listing 720. Content server 140 may receive the information input in filter text input mechanism 730, and may modify interactive product/service listing 720 based on the input information. Content server 140 may provide modified product/service listing 735 to STB 120 and STB 120 may display modified product/service listing 735 on television 110. The user may select (e.g., via pointer mechanism 740 controlled by remote control 130) an item from modified product/service listing 735. Selected listing 745 may include, for example, information (e.g., an address, a telephone number, etc.) associated with Joe's King Kar Dealership, and mechanism 765 (e.g., a button, an icon, etc.) for connecting to Joe's King Kar Dealership. If the user selects (e.g., via remote control 130) mechanism 765, the user (e.g., via television 110 and STB 120) may be connected to Joe's King Kar Dealership (e.g., via email, via an IP-based telephone call, via video chat, via instant messaging, etc.).

Process block 1060 may include the process blocks depicted in FIG. 11. As shown in FIG. 11, process block 1060 may include providing an input mechanism for a keyword filter (block 1100), receiving a keyword filter from the user via the input mechanism (block 1110), comparing the interactive product/service listing to the keyword filter to generate the modified interactive product/service listing (block 1130), and providing, for display to the user, the modified interactive product/service listing (block 1140). For example, in implementations described above in connection with FIGS. 7C and 7D, filter text input mechanism 730 may enable the user to input text that may be used to filter interactive product/service listing 720. Content server 140 may receive the information input in filter text input mechanism 730, and may modify interactive product/service listing 720 based on the input information. In one example, STB 120 and/or content server 140 may compare interactive product/service listing 720 to the information input in filter text input mechanism 730 in order to generate modified product/service listing 735. STB 120 may display modified product/service listing 735 on television 110.

Process block 1080 may include the process blocks depicted in FIG. 12. As shown in FIG. 12, process block 1080 may include one or more of enabling the user to communicate with the merchant via email (block 1200), enabling the user to communicate with the merchant via video chat (block 1210), enabling the user to communicate with the merchant via a telephone call (block 1220), or enabling the user to communicate with the merchant via instant messaging (block 1230). For example, in implementations described above in connection with FIGS. 7E-7G, if the user selects (e.g., via remote control 130) mechanism 765, the user (e.g., via television 110 and STB 120) may be connected to Joe's King Kar Dealership (e.g., via email, via an IP-based telephone call, via video chat, via instant messaging, etc.). In one example, if the user selects (e.g., via remote control 130) mechanism 765, the user (e.g., via television 110 and STB 120) may be presented with contact options 770 for connecting to Joe's King Kar Dealership. Contact options 770 may include option 775 for calling Joe's King Kar Dealership, option 780 for emailing Joe's King Kar Dealership, and option 785 for video chatting with a live person at Joe's King Kar Dealership. If the user selects (e.g., via remote control 130) option 775, the user (e.g., via television 110 and STB 120) may place a call to Joe's King Kar Dealership. If the user selects (e.g., via remote control 130) option 780, the user (e.g., via television 110 and STB 120) may write and send an email to Joe's King Kar Dealership. If the user selects (e.g., via remote control 130) option 780, the user (e.g., via television 110 and STB 120) may be presented with live video chat 790 session with Joe's King Kar Dealership. Live video chat 790 may enable the user to see (e.g., in window 795) and interact with a representative from Joe's King Kar Dealership.

Systems and/or methods described herein may provide an interactive product/service listing to a TV viewer based on TV content and/or commercials viewed by the viewer during a particular time period. In one implementation, for example, the systems and/or methods may receive selection of TV content from a device associated with a user, and may track metadata associated with the TV content for a time period. The systems and/or methods may track, for the time period, commercials provided during display of the TV content, and may determine an interactive product/service listing based on the tracked metadata and commercials. The systems and/or methods may provide the interactive product/service listing to the device. When the user selects an item from the interactive product/service listing, the device may interact with a merchant associated with the selected item. Such an arrangement may provide a passive marketplace for merchants to provide responses to the user's interest via a television framework. The user may modify, via the television framework, the interactive product/service listing based on user preferences and/or other constraints.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 9-12, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device, the method comprising:
   receiving, by the computing device, selection of television content from a device associated with a user;
   collecting, by the computing device for a period of time defined by the user, metadata associated with the selected television content;
   collecting, by the computing device, information associated with commercials associated with the television content;
   determining, by the computing device, an interactive product/service listing based on the collected metadata and commercial information; and
   providing, by the computing device, the interactive product/service listing to the device.

2. The method of claim 1, further comprising:
   providing the selected television content to the device; and
   providing, to the device, the commercials during provision of the selected television content.

3. The method of claim 1, where the device provides the interactive product/service listing for display to the user.

4. The method of claim 3, where, when the user selects an item from the displayed interactive product/service listing, the device interacts with a merchant associated with the selected item.

5. The method of claim 1, where the device includes a set-top box (STB).

6. The method of claim 1, where the commercial information is collected for a particular time period.

7. The method of claim 6, where the particular time period is defined by the user.

8. The method of claim 1, where the collected metadata includes one or more of:
   a description of the selected television content,
   a file format of the selected television content,
   an author of the selected television content, a rights holder of the selected television content,
a title of the selected television content, or
actors associated with the selected television content.

9. The method of claim 1, where the collected commercial information includes one or more of:
descriptions of the commercials,
file formats of the commercials,
authors of the commercials,
rights holders of the commercials,
titles of the commercials, or
actors associated with the commercials.

10. The method of claim 1, where the interactive product/service listing includes a list of products and services related to the collected metadata and commercial information.

11. A method implemented by a set-top box (STB), the method comprising:
receiving, by the set-top box, selection of television content by a user;
providing, by the set-top box, the selected television content and commercials, associated with the television content, for display to the user;
tracking, for a user-configured time period, metadata associated with the selected television content and commercial information associated with the commercials,
receiving, by the set-top box, an interactive product/service listing generated based on the tracked metadata associated with the selected television content and on the tracked commercial information associated with the commercials;
providing, by the set-top box, the interactive product/service listing for display to the user; and
enabling, by the set-top box, the user to interact with the interactive product/service listing.

12. The method of claim 11, further comprising:
receiving selection, by the user, of a particular button on a remote control; and
providing, based on selection of the particular button, the interactive product/service listing for display to the user.

13. The method of claim 11, further comprising:
enabling the user to modify the interactive product/service listing based on constraints provided by the user;
receiving selection, by the user, of an item from the modified interactive product/service listing; and
enabling the user to interact with a merchant associated with the selected item.

14. The method of claim 13, where enabling the user to modify the interactive product/service listing includes:
providing, for display to the user, an input mechanism for a keyword filter,
receiving a particular keyword filter from the user via the input mechanism,
comparing the interactive product/service listing to the particular keyword filter to generate the modified interactive product/service listing, and
providing the modified interactive product/service listing for display to the user.

15. The method of claim 13, where enabling the user to interact with a merchant includes one or more of:
enabling the user to communicate with the merchant via email,
enabling the user to communicate with the merchant via video chat,
enabling the user to communicate with the merchant via a telephone call, or
enabling the user to communicate with the merchant via instant messaging.

16. A device, comprising:
a memory to store a plurality of instructions; and
a processor to execute instructions in the memory to:
receive selection of television content from a set-top box associated with a user,
provide the selected television content to the set-top box,
collect metadata associated with the selected television content,
provide, to the set-top box, commercials during provision of the selected television content,
collect, for a period of time set by the user, information associated with the commercials,
determine an interactive product/service listing based on the collected metadata and commercial information, and
provide the interactive product/service listing to the set-top box.

17. The device of claim 16, where the set-top box provides the interactive product/service listing for display to the user.

18. The device of claim 17, where, when the user selects an item from the displayed interactive product/service listing, the set-top box interacts with a merchant associated with the selected item.

19. The device of claim 16, where the metadata is collected for a particular time period.

20. The device of claim 19, where the particular time period is defined by the user.

21. A device, comprising:
a memory to store a plurality of instructions; and
a processor to execute instructions in the memory to:
receive selection of television content by a user,
provide the selected television content and commercials, provided during provision of the television content, for display to the user,
determine commercial information associated with the commercials and metadata associated with the television content collected for a user-configurable period of time,
receive an interactive product/service listing generated based on the collected commercial information associated with the commercials and on the collected metadata associated with the television content,
receive selection, by the user, of a particular button on a remote control,
provide, based on selection of the particular button, the interactive product/service listing for display to the user, and
enable the user to interact with the interactive product/service listing.

22. The device of claim 21, where the processor is further to execute instructions in the memory to:
enable the user to modify the interactive product/service listing based on constraints provided by the user,
receive selection, by the user, of an item from the modified interactive product/service listing, and
enable the user to interact with a merchant associated with the selected item.

23. The device of claim 22, where, when enabling the user to modify the interactive product/service listing, the processor is further to execute instructions in the memory to:
provide, for display to the user, an input mechanism for a keyword filter,
receive a particular keyword filter from the user via the input mechanism,
compare the interactive product/service listing to the particular keyword filter to generate the modified interactive product/service listing, and provide the modified interactive product/service listing for display to the user.

24. The device of claim 22, where, when enabling the user to interact with a merchant, the processor is further to execute instructions in the memory to one or more of:

enable the user to communicate with the merchant via email, enable the user to communicate with the merchant via video chat, enable the user to communicate with the merchant via a telephone call, or enable the user to communicate with the merchant via instant messaging.

25. The device of claim 21, where the interactive product/service listing includes a list of products and services related to the metadata and the commercials.

* * * * *